(12) United States Patent
Klein et al.

(10) Patent No.: US 10,564,719 B1
(45) Date of Patent: Feb. 18, 2020

(54) AUGMENTING THE FUNCTIONALITY OF USER INPUT DEVICES USING A DIGITAL GLOVE

(71) Applicant: MICROSOFT TECHNOLOGY LICENSING, LLC, Redmond, WA (US)

(72) Inventors: Christian Klein, Duvall, WA (US); Andrew Stuart Glass, Seattle, WA (US); Sang Ho Yoon, Redmond, WA (US); Roy H. Berger, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/207,936

(22) Filed: Dec. 3, 2018

(51) Int. Cl.
*G06F 3/01* (2006.01)
*G06F 3/0484* (2013.01)

(52) U.S. Cl.
CPC .............. *G06F 3/014* (2013.01); *G06F 3/013* (2013.01); *G06F 3/017* (2013.01); *G06F 3/04847* (2013.01)

(58) Field of Classification Search
None
See application file for complete search history.

(56) References Cited

U.S. PATENT DOCUMENTS

| | | | | |
|---|---|---|---|---|
| 6,701,296 | B1 * | 3/2004 | Kramer | A61B 5/6806 370/545 |
| 6,885,361 | B1 * | 4/2005 | Harvill | G06F 3/016 341/27 |
| 9,996,153 | B1 * | 6/2018 | Trotta | G06F 3/014 |
| 2004/0169636 | A1 | 9/2004 | Park et al. | |
| 2012/0030606 | A1 | 2/2012 | Zhang | |
| 2012/0127071 | A1 | 5/2012 | Jitkoff et al. | |
| 2013/0120434 | A1 | 5/2013 | Kim | |
| 2013/0203469 | A1 | 8/2013 | Cho et al. | |
| 2013/0249806 | A1 | 9/2013 | Crisan | |
| 2014/0191977 | A1 | 7/2014 | Feng et al. | |
| 2014/0337804 | A1 | 11/2014 | Hwang et al. | |
| 2014/0365949 | A1 | 12/2014 | Xia et al. | |
| 2016/0124532 | A1 | 5/2016 | Wolff et al. | |

(Continued)

OTHER PUBLICATIONS

"Non Final Office Action Issued in U.S. Appl. No. 16/207,973", dated Nov. 4, 2019, 13 Pages.

(Continued)

*Primary Examiner* — Nicholas J Lee
(74) *Attorney, Agent, or Firm* — Newport IP, LLC; Michael C. Johnson; Scott Y. Shigeta

(57) ABSTRACT

The disclosed technologies address various technical problems, including improving human-computer interaction, by augmenting the functionality provided by user input devices using a digital glove. For example, a digital glove can be utilized to provide pressure sensitivity for non-pressure sensitive touchscreen devices, attribute input made with a digital pen to a user wearing the digital glove, augment the functionality provided by mice and other types of handheld user input devices, augment the functionality provided gaze tracking systems, improve camera-based motion tracking systems, and to augment the functionality provided by speech recognition systems.

20 Claims, 19 Drawing Sheets

(56) References Cited

U.S. PATENT DOCUMENTS

| | | | | |
|---|---|---|---|---|
| 2016/0187973 A1* | 6/2016 | Shankar | ............... | G06F 3/014 |
| | | | | 345/156 |
| 2016/0246369 A1* | 8/2016 | Osman | ............... | A63F 13/212 |
| 2016/0342207 A1* | 11/2016 | Beran | ............... | G06F 3/011 |
| 2017/0109020 A1 | 4/2017 | Sliter et al. | | |
| 2017/0177077 A1* | 6/2017 | Yang | ............... | G06F 3/013 |
| 2018/0032203 A1 | 2/2018 | Sepulveda et al. | | |
| 2018/0074637 A1 | 3/2018 | Rosenberg et al. | | |
| 2018/0107277 A1* | 4/2018 | Keller | ............... | G06F 3/014 |
| 2018/0120985 A1 | 5/2018 | Wallace et al. | | |
| 2018/0260796 A1 | 9/2018 | Mcdonald et al. | | |
| 2018/0328808 A1* | 11/2018 | Jourdan | ............... | G01M 3/20 |
| 2018/0356893 A1 | 12/2018 | Soni | | |
| 2019/0102927 A1* | 4/2019 | Yokokawa | ............... | G06T 13/40 |

OTHER PUBLICATIONS

"Non Final Office Action Issued in U.S. Appl. No. 16/207,794", dated Dec. 19, 2019, 24 Pages.

"Non Final Office Action Issued in U.S. Appl. No. 16/207,840", dated Dec. 12, 2019, 14 Pages.

* cited by examiner

AUGMENTING THE FUNCTIONALITY OF USER INPUT DEVICES USING A DIGITAL GLOVE

BACKGROUND

Computers can utilize many different types of user input devices: touchscreens; mice; digital pens; digital dials; eye tracking systems; and motion tracking systems, just to name a few. Each of these user input devices has its own set of strengths and weaknesses. One weakness that each of these devices have in common is that their functionality is generally fixed at the time they are manufactured.

Some aspects of the functionality of certain user input devices can be modified through software or firmware updates. However, the physical configuration and primary hardware functionality of user input devices typically cannot be changed after they are manufactured. For instance, non-pressure sensitive touchscreens cannot become pressure sensitive, the number of physical buttons on a mouse or digital dial cannot be increased, and motion tracking systems cannot be upgraded to track the pose and motion of body parts that are occluded from view. The lack of upgradability can limit the ways in which users of such devices can interact with computing systems. Moreover, the lack of upgradability can also cause users to purchase expensive new devices in order to access improved functionality.

It is with respect to these and other technical challenges that the disclosure made herein is presented.

SUMMARY

Technologies are disclosed herein than can augment the functionality provided by user input devices using a digital glove. The disclosed technologies address the technical problems described above by augmenting the functionality provided by existing user input devices to enable additional functionality that is otherwise not possible. Moreover, through implementations of the disclosed technologies, human-computer interaction can be improved, thereby improving the overall operation of computing systems that implement the disclosed technologies. Other technical benefits not specifically mentioned herein can also be realized through implementations of the disclosed subject matter.

In order to realize the technical benefits mentioned briefly above, and potentially others, the technologies disclosed herein are implemented in conjunction with a digital glove. A digital glove is a glove that has been configured with sensors to detect the pose of the wearer's (who also might be referred to as a "user") hand and pressure exerted at the fingertips of their hand. For instance, the fingers of a digital glove can be equipped with flex/bend/stretch sensors (referred to herein as "flex sensors"), sensors based upon capacitive/piezoresistive sensing for example, capable of detecting the amount of flex or bend in a wearer's fingers.

Tactile pressure sensors (which might be referred to herein as "pressure sensors") can also be mounted in the fingertips of a digital glove to sense the amount of pressure at the fingertips of a wearer. An inertial measurement unit ("IMU") might also be included in a digital glove to detect the pronation and supination of the wearer's hand. Digital gloves can also, or alternately, include other types of sensors in order to detect other aspects of the pose of a user's hand. Digital gloves can also include output devices, such as haptic devices including LRA, ERM, voice-coil, and various types of actuating hardware, to provide feedback to a wearer.

Digital gloves are typically paired with a host computer and include appropriate hardware to transmit sensor data to the host computer. For example, a digital glove can transmit flex data to a host computer that describes the flex in a user's fingers, pressure data indicating the pressure exerted at the fingertips of a user, and IMU data describing the pronation and supination of the user's hand. A digital glove can also receive instructions from the host computer to activate haptics or other types of feedback in a digital glove. As will be described in detail below, a digital glove such as that described briefly above can be configured to augment the functionality of existing user input devices such as, but not limited to, touchscreen devices, mice, digital dials, digital pens, motion tracking systems, and speech recognition systems.

Enabling Pressure Sensitivity for Non-Pressure Sensitive Touchscreen Devices

In one configuration, a digital glove can be used to provide pressure sensitivity for non-pressure sensitive touchscreen devices. In particular, a digital glove such as that described above can be coupled, either wirelessly or using a wired connection, to a computing device (which might be referred to below as the "host computer") that is configured with a non-pressure sensitive touchscreen. When the computing device detects an input at a location on the non-pressure sensitive touchscreen, the device can obtain pressure data generated by the digital glove. The computing device can then determine, based upon the pressure data, whether a tactile pressure sensor in a finger of the digital glove observed an amount of pressure in excess of a threshold amount at the time the input on the touchscreen was detected.

If the tactile pressure sensor in the finger of the digital glove observed an amount of pressure in excess of the threshold amount at the time the input on the touchscreen was detected, the computing device can perform a function. The function can be selected based, at least in part, upon the amount of pressure observed by the tactile pressure sensor in the finger of the glove at the time the input was detected. The function might include, for example, presenting a user interface on the display at the location of the touch detected on the touchscreen, selecting a UI control at the location on the touchscreen, activating a program on the computing device associated with content presented at the location, or initiating a function selected based upon the amount of pressure exerted. The function can also be selected based upon the finger used to exert the pressure in excess of the threshold amount.

If the tactile pressure sensor in the finger of the digital glove observes an amount of pressure in excess of the threshold amount at the time the input on the touchscreen was detected, the computing device can also provide a command to the digital glove to activate a haptic device in the finger of the digital glove that observed the pressure in excess of the threshold amount. Other types of haptic feedback can be provided in other configurations.

Attributing Input Made with a Digital Pen to a User Wearing a Digital Glove

In another configuration, a digital glove can be used to attribute input made with a digital pen to a user wearing the digital glove. In particular, a digital glove such as that described above can be coupled, either wirelessly or using a wired connection, to a computing device, such as a digital whiteboard. A digital whiteboard is capable of detecting input made by a digital pen on the whiteboard and to generate digital ink therefrom.

When the computing device detects input (e.g. a user writing on the whiteboard with a digital pen), the computing device obtains pressure data and flex data generated by the digital glove. The computing device then determines, based at least in part on the pressure data and the flex data, whether the digital glove is being used to interact with a digital pen. In response to determining that the digital glove is being used to interact with a pen, the computing device can augment the input detected by the computing device with data identifying a user associated with the digital glove. For instance, the computing device might store data identifying the user wearing the digital glove as the user that made the input. As another example, the computing device may apply user-specific styling or settings to digital ink (e.g. the user's favorite ink color, personalized handwriting beautification, language models, etc.).

The computing device can also detect, based upon the pressure sensors in the digital glove, that a user is exerting pressure on the barrel of a digital pen. In response thereto, the computing device can perform certain functions such as, but not limited to, modifying a setting associated with the digital pen based on the pressure data or the flex data. For instance, the computing device might modify an ink color or pen type for digital ink generated by the digital pen or switch between pen modes, such as between inking and UI navigation modes. The computing device can also provide a command to the digital glove to activate a haptic device in the digital glove responsive to modifying the setting associated with the digital pen.

Augmenting the Functionality of Mice and Other User Input Devices Using a Digital Glove In another configuration, a digital glove can be used to augment the functionality provided by mice and other types of user input devices. In particular, a digital glove such as that described above can be coupled to a computing device, either wirelessly or using a wired connection. When the computing device detects input (e.g. a user selecting a button on a mouse or other type of user input device), the computing device obtains pressure data generated by the digital glove.

The computing device then performs a function, or functions, that is selected based, at least in part, upon the particular fingers used to exert pressure on the user input device and/or the amount of pressure observed by the tactile pressure sensors of the digital glove at the time the input was made to the user input device. For example, if the computing device detects the selection of a mouse button, the computing device can initiate a function based on the particular finger, or fingers, used to select the mouse button and/or the amount of pressure exerted. As another example, the computing device can initiate a function based upon the finger, or fingers, used to select a button on a digital dial and/or the amount of pressure exerted when selecting the button. Different functions might be initiated based upon detecting that multiple fingers were used to perform the selection operation. The function can include, for instance, presenting a UI for modifying settings associated with the user input device.

The computing device can also provide a command to the digital glove to activate a haptic device in the digital glove when it detects that pressure was exerted at the time the input was made to the user input device. The computing device might only activate a haptic device in the finger, or fingers, used to exert pressure on the user input device at the time the user input was detected.

Initiating Functions with Respect to Gaze Targets Using a Digital Glove

In another configuration, a digital glove can be used to augment the functionality provided by a gaze tracking system. In particular, a digital glove such as that described above can be coupled to a computing device, either wirelessly or using a wired connection. The computing device can also include, or be coupled to, a gaze tracking system capable of generating gaze data that describes the location, referred to as a "gaze target," that a user is looking at. The gaze tracking system might also identify a particular object at the location of the gaze target. For instance, the gaze tracking system might identify an object on a display screen, a person, an item, or another type of object.

As in the examples described briefly above, the computing device can obtain pressure data, flex data, and IMU data from the digital glove. The computing device can determine, based on the pressure data and/or the flex data, that a user initiated a request to perform a function. For instance, the computing device might determine that a user of the digital glove tapped two fingers together at a particular point in time. In response thereto, the computing device can identify an object based upon the gaze target identified at the time the user made the selection. The computing device can then perform a function with respect to the identified object. For example, the computing device might select or activate an on-screen object that a user is looking at when they make a selection gesture using the digital glove. The computing device can perform other types of functions based upon the direction a user is looking when the user initiates a function using a digital glove.

Improved Interface to a Speech Recognition Component Using a Digital Glove

In another configuration, a digital glove can be used to augment the functionality provided by a speech recognition system. In particular, a digital glove such as that described above can be coupled to a computing device, either wirelessly or using a wired connection. The computing device can also include a speech recognition component capable of recognizing human speech. The speech recognition component can also present a UI that includes a number of items. For example, the speech recognition component might present a UI that includes selectable items that identify phonetic alternates for a word dictated to the speech recognition component.

The computing device can also obtain pressure data and flex data from the digital glove as in the examples above. The computing device can determine, based on the pressure data and/or the flex data, that a user of the digital glove has extended a finger, or fingers. In response thereto, the computing device can select one of the items in the UI. The selected item can correspond to the finger of the glove that has been extended. For instance, the computing device might select the first item in the UI in response to determining that a user has extended their index finger, might select the second item in the UI in response to determining that a user has extended their middle finger, and so on.

The computing device can also determine, based at least in part upon the pressure data and the flex data, that a user has performed a pinch gesture by touching together the tips of two or more fingers. The computing device can then perform various functions in response to detecting the pinch gesture such as, but not limited to, selecting an item from a UI, causing the speech recognition component to switch between a dictation mode and a command mode, or to switch between a first dictation language and a second dictation language.

Augmenting a 3D Model Created by a Camera-Based Motion Tracking System with Data Generated by a Digital Glove In another configuration, a digital glove can be used to augment the functionality provided by a camera-based motion tracking system. In particular, a digital glove such as that described above can be coupled to a computing device, either wirelessly or using a wired connection. The computing device can also include or be coupled to a camera-based motion tracking system capable of tracking the motion of a user and generating a three-dimensional ("3D") model describing the position of the user and their appendages. Camera-based motion tracking systems cannot, however, determine the position of a user's body parts that are occluded from the view of the motion tracking system. For instance, a camera-based motion tracking system will be unable to model the position of a user's hand if the hand is behind the user's back and, therefore, occluded from the view of the motion tracking system.

In order to address this problem, the computing device can determine the pose of an occluded hand of a user based upon the flex data, pressure data, and/or IMU data obtained from the digital glove. Data describing the hand pose can then be used to augment a 3D model generated by the camera-based motion tracking system or used in another manner.

It should be appreciated that the aspects of the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
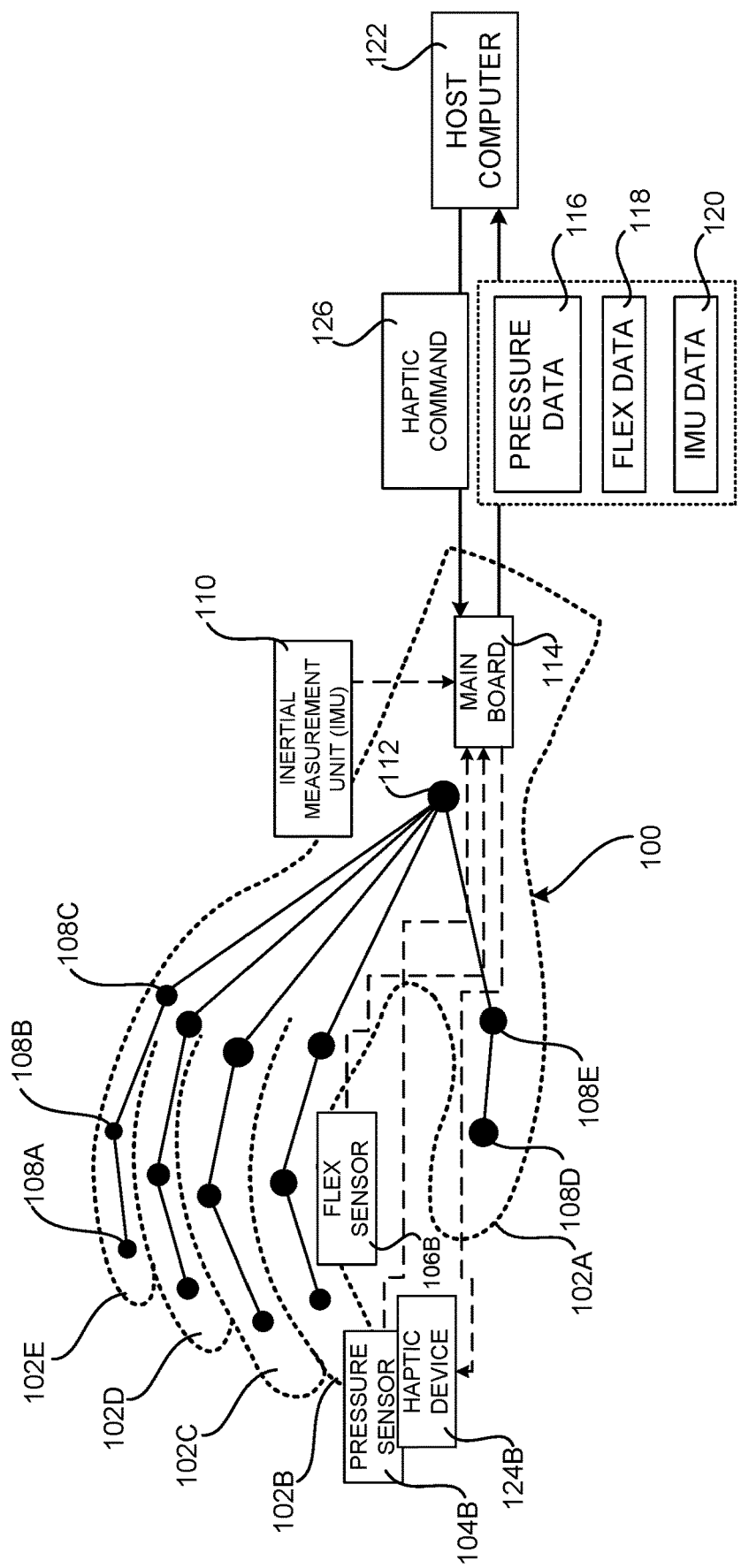
FIG. 1 is a computing architecture diagram that shows aspects of the configuration and operation of an illustrative digital glove utilized in various embodiments disclosed herein.

The following detailed description is directed to technologies for augmenting the functionality provided by user input devices using a digital glove. As discussed briefly above, implementations of the disclosed technologies can improve human-computer interaction, thereby improving the overall operation of computing systems that implement the disclosed technologies. Other technical benefits not specifically mentioned herein can also be realized through implementations of the disclosed subject matter.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for augmenting the functionality provided by user input devices using a digital glove will be described.

FIG. 1 is a computing architecture diagram that shows aspects of the configuration and operation of an illustrative digital glove 100 utilized in various embodiments disclosed herein. As described briefly above, a digital glove 100 is a glove that has been configured with sensors to detect the pose of the wearer's (who also might be referred to as a "user") hand and pressure exerted at the fingertips of the user's hand. For instance, the fingers 102A-102E of a digital glove 100 can be equipped with flex sensors, also called "bend sensors," capable of detecting the amount of flex or bend in a wearer's fingers. For instance, the fingers of a digital glove can be equipped with sensors based upon capacitive/piezoresistive sensing. In the example configuration shown in FIG. 1, only a single flex sensor 106B has been illustrated in the index finger 102B of the digital glove 100 for ease of reference. It is to be appreciated, however, that the digital glove 100 can be configured with one or more flex sensors 106 in each of the fingers 102A-102D.

The flex sensors 106 can be mounted in the digital glove 100 such that the flex of the joints of a user's hand can be measured. For example, the digital glove 100 can include flex sensors 106 for measuring the flex in a user's distal interphalangeal ("DIP") joint 108A, proximal interphalangeal ("PIP") joint 108B, metacarpophalangeal ("MCP") joint 108C, interphalangeal ("IP") joint 108D, and metacarpophalangeal ("MCP") joint 108E.

Tactile pressure sensors 104 (which might be referred to herein as "pressure sensors 104") can also be mounted in the fingertips of the digital glove 100 to sense the amount of pressure exerted by the fingertips of a wearer. In the example configuration shown in FIG. 1, only a single pressure sensor 104B has been illustrated in the tip of the index finger 102B of the digital glove 100 for ease of reference. It is to be appreciated, however, that the digital glove 100 can be configured with one or more pressure sensors 104 in the tips of each of the fingers 102A-102D. Pressure sensors can be mounted at other positions in the digital glove 100 in other configurations.

The digital glove 100 might also include an inertial measurement unit ("IMU") 110. The IMU 110 can detect the pronation and supination of the wearer's hand. The IMU 110 might be mounted in the digital glove 100 at a location at or around the user's wrist 112. The digital glove 100 can also, or alternately, include other types of sensors in order to detect other aspects of the pose of a user's hand.

The digital glove 100 can also include output devices, such as one or more haptic devices 124B, to provide feedback to a wearer. In the example configuration shown in FIG. 1, only a single haptic device 124B has been illustrated in the tip of the index finger 102B of the digital glove 100 for ease of reference. It is to be appreciated, however, that the digital glove 100 can be configured with one or more haptic devices 124 in the tips of each of the fingers 102A-102D. Haptic devices 124 can be mounted at other positions in the digital glove 100 in other configurations. The haptic devices 124 can be implemented using various technologies such as, but not limited to, LRA, ERM, voice-coil, and various other types of actuating hardware.

As illustrated in FIG. 1, the digital glove 100 is also equipped with a main board 114. The main board 114 is a circuit board that receives pressure data 116 describing the pressure exerted by a user's fingers from the pressure sensors 104. The main board 114 also receives flex data 118 describing the flex in a user's fingers from the flex sensors 106. The main board 114 also receives IMU data 120 describing the pronation and supination of a user's hand. The main board 114 can receive other types of data describing other aspects of the pose of a user's hand from other types of sensors in other configurations.

As also shown in FIG. 1, the main board 114 is connected to a host computer 122 via a wired or wireless connection. The host computer 122 can be any type of computer including, but not limited to, a desktop computer, laptop computer, smartphone, tablet computer, electronic whiteboard, video game system, and augmented or virtual reality systems. The main board 114 includes appropriate hardware to transmit sensor data to the host computer 122. For example, the digital glove 100 can transmit the pressure data 116, flex data 118, and IMU data 120 to the host computer 122 for processing in the manner described below. The main board 114 of the digital glove 100 can also receive haptic commands 126 from the host computer 122 instructing the digital glove 100 to activate one or more of the haptic devices 124.

The digital glove 100 can be calibrated prior to use in order to provide accurate measurements for the motion and pressure of a particular user's hand. For instance, the digital glove 100 might be calibrated based upon the flex of a particular user's hand and/or the amount of pressure exerted by the user. The digital glove 100 might be re-calibrated when another user utilizes the digital glove 100.

Although illustrated in FIG. 1 as encompassing all five of a user's fingers, the digital glove 100 might encompass fewer fingers in other configurations. The digital glove 100 can be constructed from cloth, leather, or another type of material. In some configurations, all or a portion of the material is conductive such that a user of the glove 100 can interact with a capacitive touchscreen device while wearing the glove 100. The digital glove 100 might be battery powered or powered by a cable from the host computer 122. In this regard, it is to be appreciated that the configuration of the digital glove 100 shown in FIG. 1 has been simplified for ease of discussion and might include additional or alternate components in other configurations.

Figure 6A:
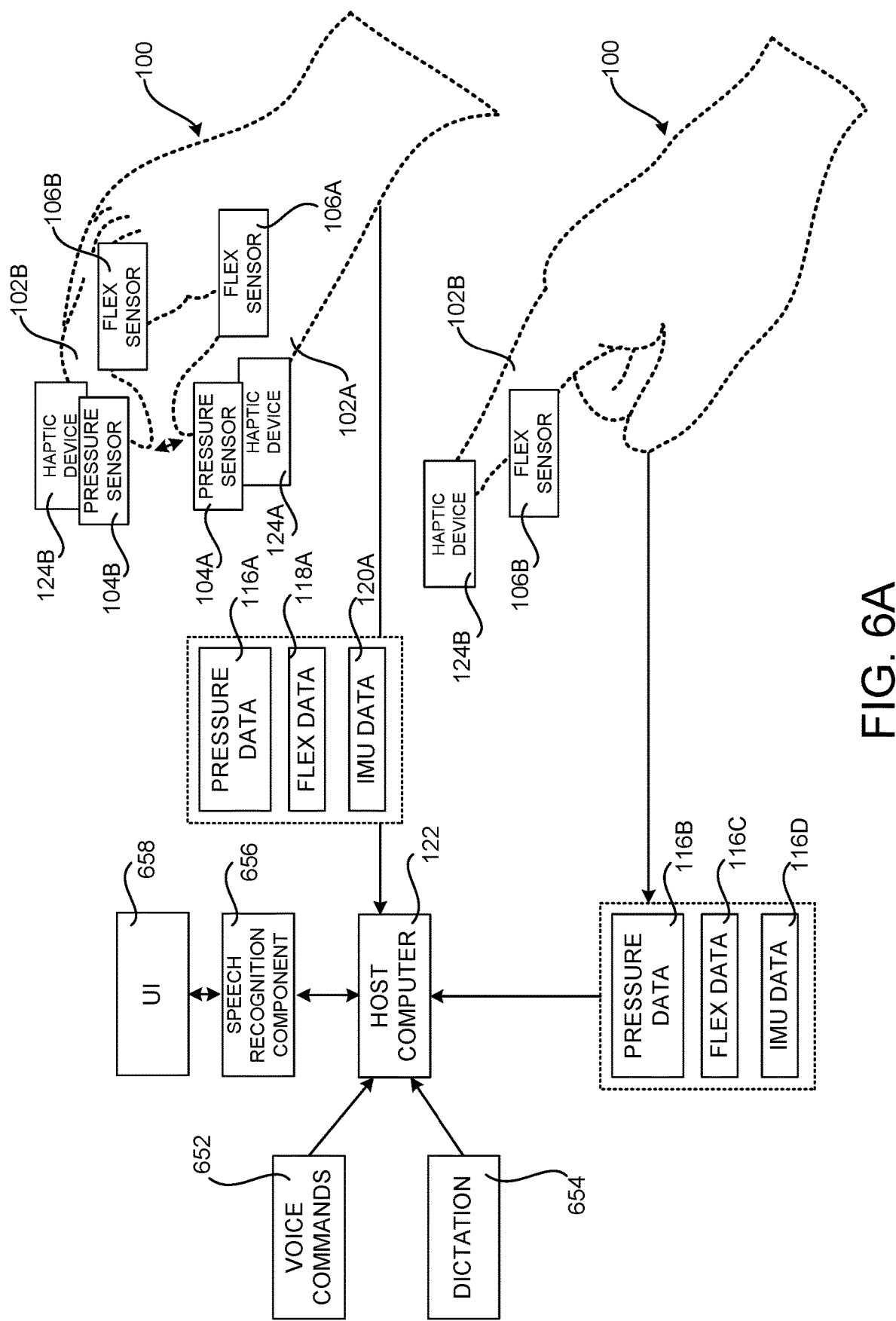
FIG. 6A is a schematic diagram showing aspects of the operation of a digital glove for providing an improved human-computer interface to a speech recognition component.
Figure 6B:
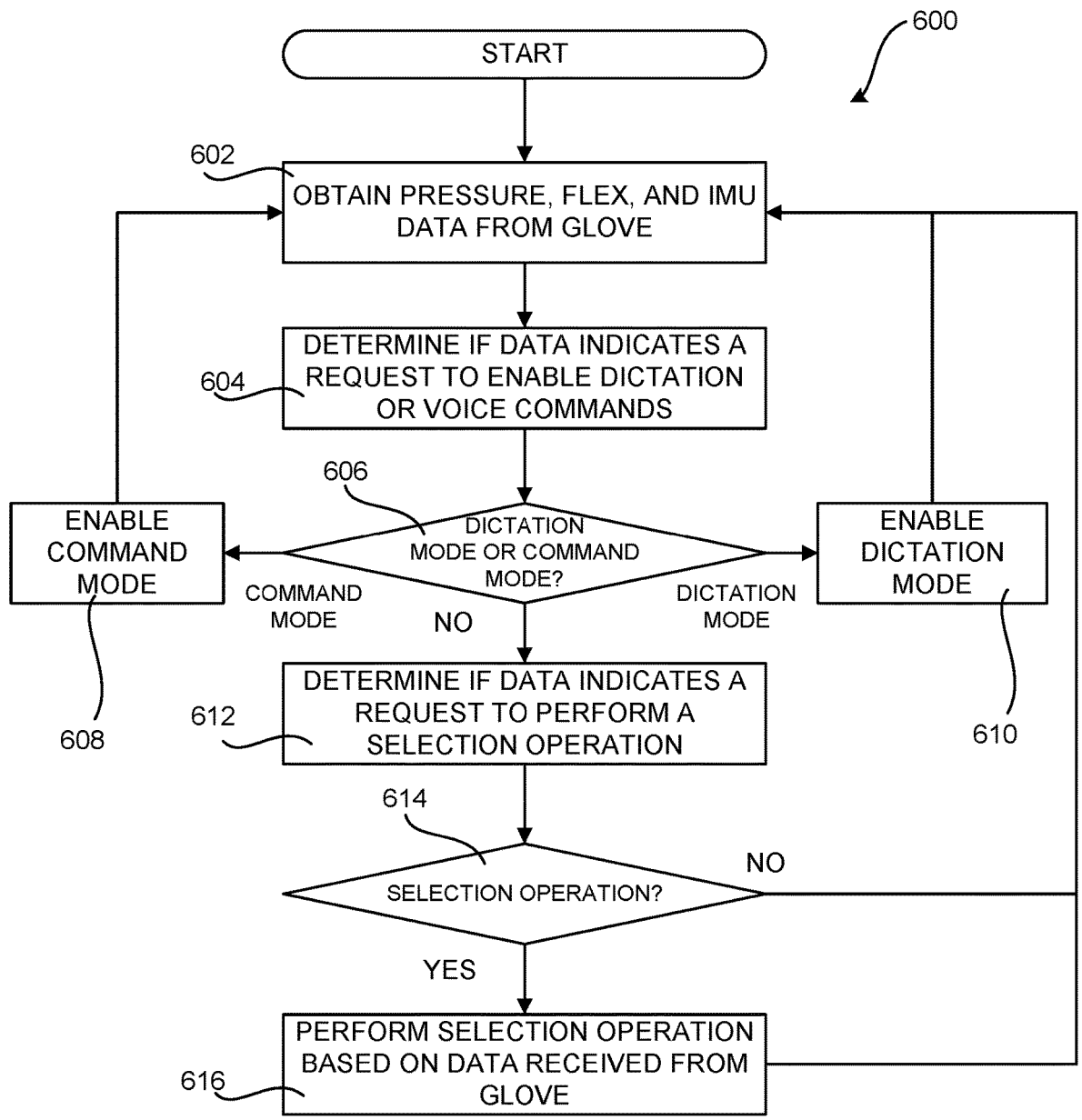
FIG. 6B is a flow diagram showing a routine that illustrates aspects of the operation of a digital glove for providing an improved human-computer interface to a speech recognition component, as described with reference to FIG. 6A.
Figure 7A:
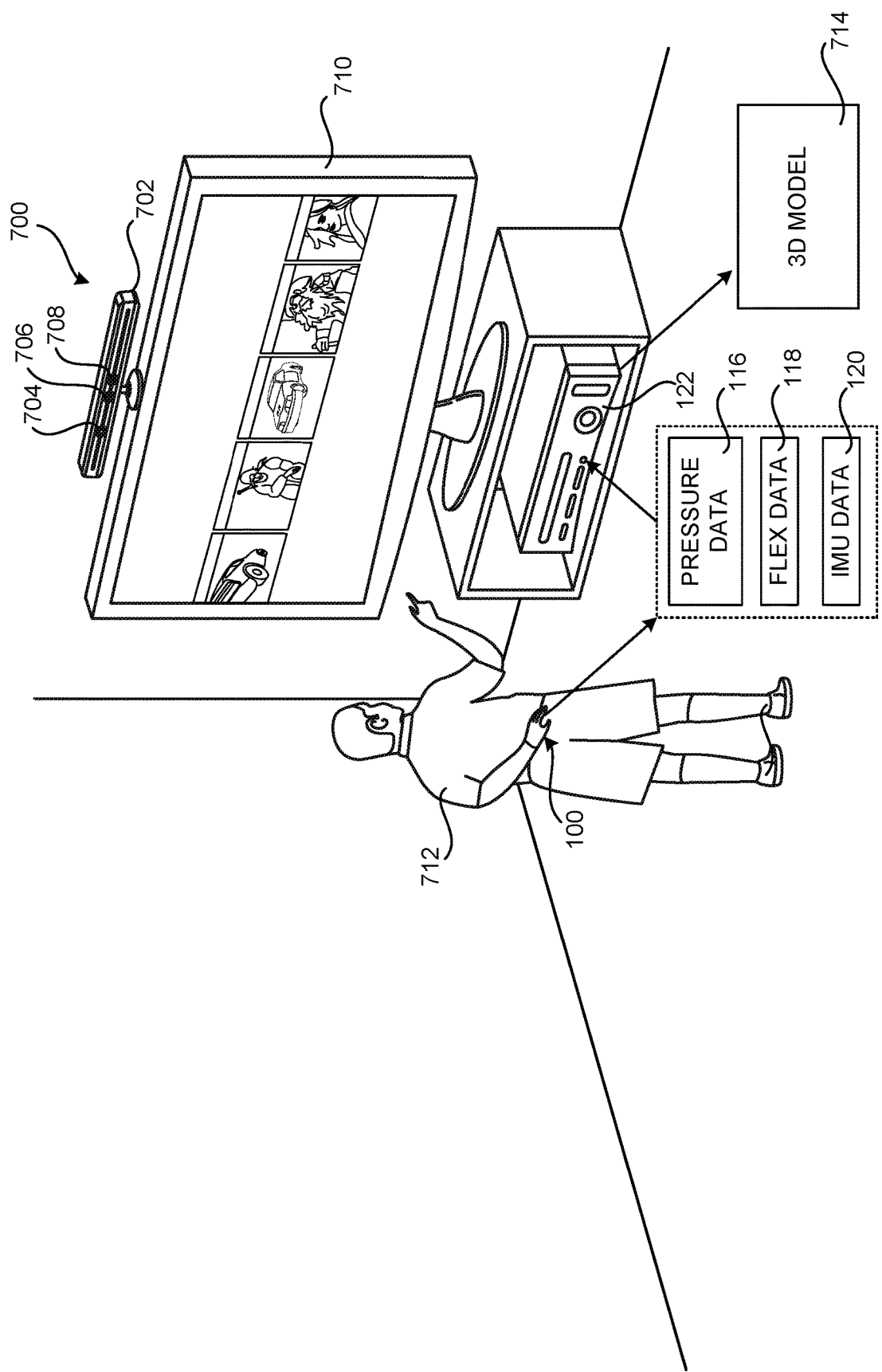
FIG. 7A is a schematic diagram showing aspects of the operation of a digital glove for augmenting a 3D model created by a motion tracking system.
Figure 7B:
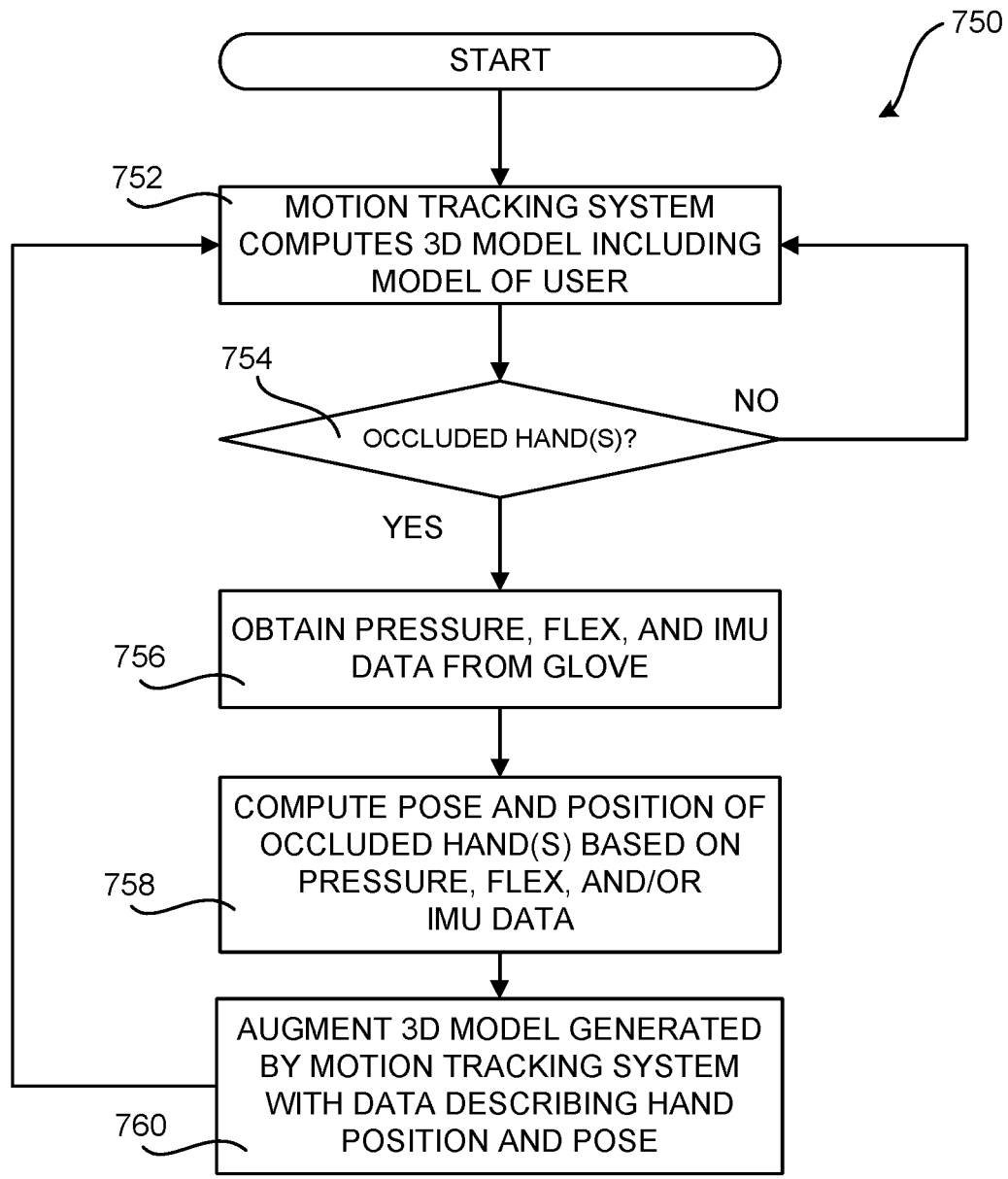
FIG. 7B is a flow diagram showing a routine that illustrates aspects of the operation of a digital glove for augmenting a 3D model created by a motion tracking system, as described with reference to FIG. 7A.

As will be described in detail below, the digital glove 100 and the host computer 122 can be configured to augment the functionality of existing user input devices such as, but not limited to, touchscreen devices (FIGS. 2A and 2B), digital pens (FIGS. 3A and 3B), mice (FIGS. 4A-4E), digital dials (FIGS. 5A and 5B), speech recognition systems (FIGS. 6A and 6B), and motion tracking systems (FIGS. 7A and 7B).

Enabling Pressure Sensitivity for Non-Pressure Sensitive Touchscreen Devices

Figure 2A:
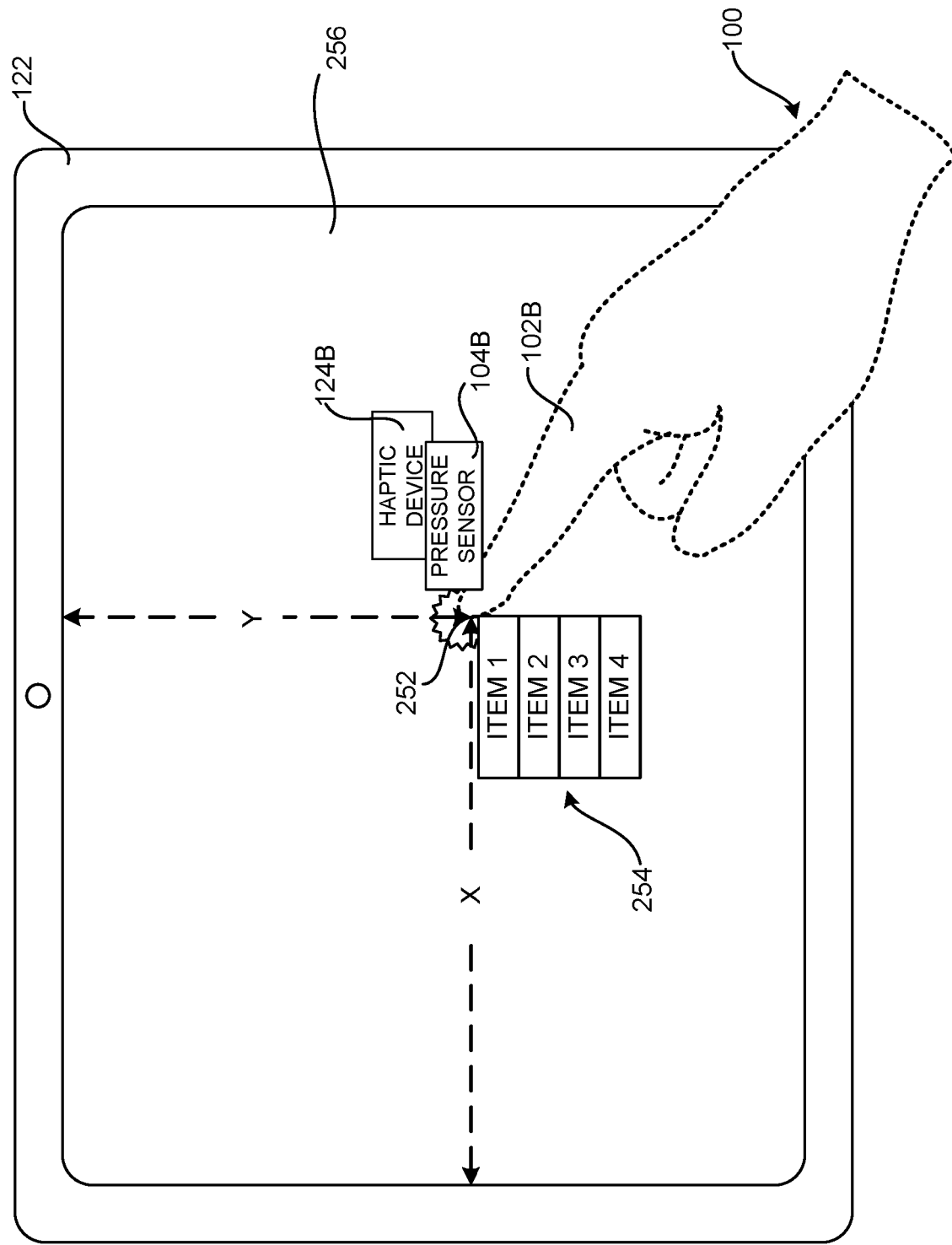
FIG. 2A is a schematic diagram showing aspects of the operation of a digital glove and a host computer for enabling pressure sensitivity for a non-pressure sensitive touchscreen.

FIG. 2A is a schematic diagram showing aspects of the operation of a digital glove 100 and a host computer 122 for enabling pressure sensitivity for a host computer 122 equipped with a non-pressure sensitive touchscreen 256. In the example shown in FIG. 2, the host computer 122 is a tablet computing device equipped with a touchscreen 256 that is not pressure sensitive. It is to be appreciated, however, that the configurations disclosed herein can be implemented with other types of computing devices having touchscreens 256 that are not pressure sensitive.

When the host computer 122 detects an input at a location 252 on the non-pressure sensitive touchscreen 256, the device 122 can obtain pressure data 116 generated by the digital glove 100. The host computer 122 can then determine, based upon the pressure data 116, whether a tactile pressure sensor 104B in a finger 102B of the digital glove 100 observed an amount of pressure in excess of a threshold amount at the time the input on the touchscreen 256 was detected. In this manner, the exerted pressure can be correlated with the location at which a touch was made with the glove 100 on the touchscreen 256.

If the tactile pressure sensor 104B in the finger 102B of the digital glove 100 observed an amount of pressure in excess of the threshold amount at the time the input on the touchscreen 256 was detected, the host computer 122 can perform a function. The function can be selected based, at least in part, upon the amount of pressure observed by the tactile pressure sensor 104B in the finger 102B of the glove 100 at the time the input was detected. The function might include, for example, presenting a user interface like the menu 254 on the display 256 at the location 252 of the touch detected on the touchscreen 256, selecting a UI control at the location 252 on the touchscreen 256, activating a program on the computing device 100 associated with content (e.g. an icon) presented at the location 252 on the touchscreen 256, or initiating a function selected based upon the amount of pressure exerted. The function might also be selected based upon the particular finger used to touch the touchscreen 256.

If the tactile pressure sensor 104B in the finger 102B of the digital glove 100 observes an amount of pressure in excess of the threshold amount at the time the input on the touchscreen 256 was detected, the computing device 100 can also provide a haptic command 126 to the digital glove 100 to activate a haptic device 124B in the finger 102B, or fingers 102, of the digital glove 100 that observed the pressure in excess of the threshold amount. Other types of haptic feedback can be provided in other configurations.

Figure 2B:
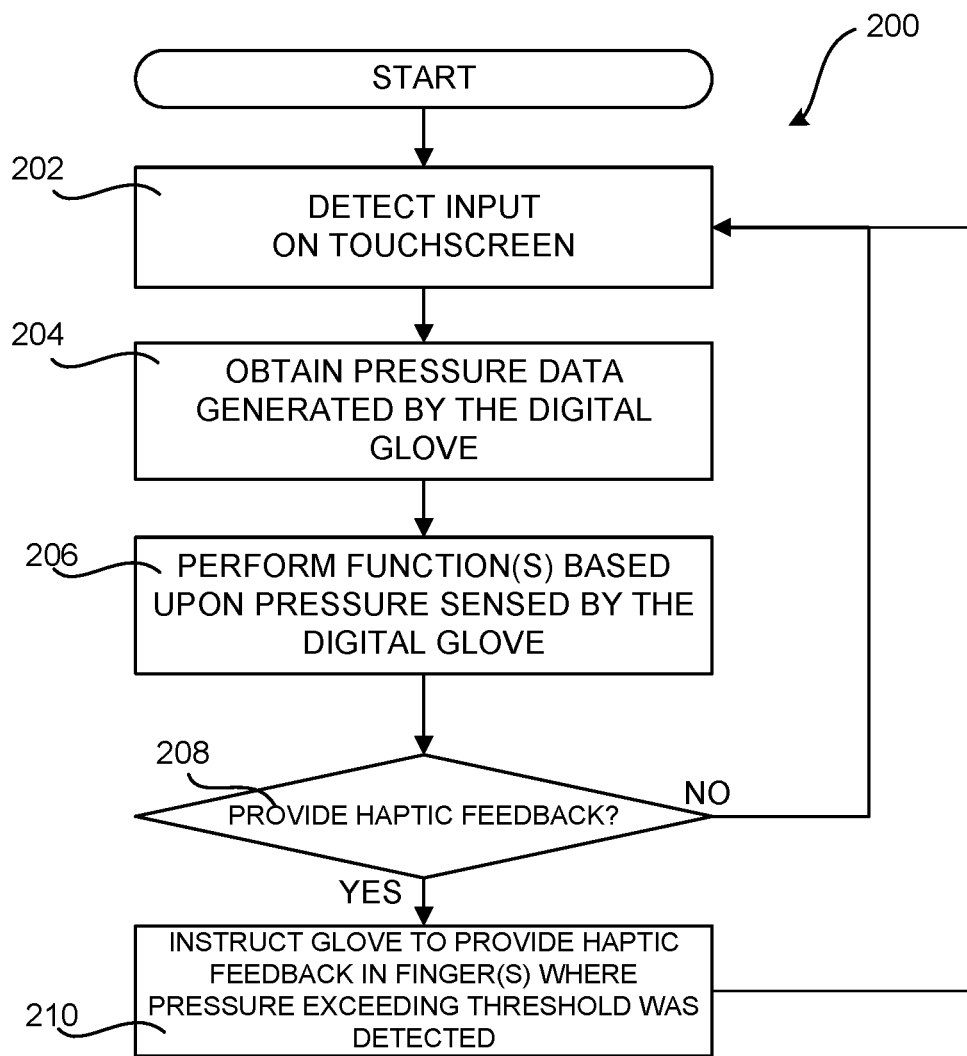
FIG. 2B is a flow diagram showing a routine that illustrates aspects of the operation of a digital glove and an associated host computer for enabling pressure sensitivity on a non-pressure sensitive touchscreen, as described with reference to FIG. 2A.

FIG. 2B is a flow diagram showing a routine 200 that illustrates aspects of the operation of the digital glove 100 and an associated host computer 122 for enabling pressure sensitivity on a non-pressure sensitive touchscreen 256, as described above with reference to FIG. 2A. It should be appreciated that the logical operations described herein with regard to FIG. 2B, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 200 begins at operation 202, where the host computer 122 detects input on the touchscreen 256. The routine 200 then proceeds from operation 202 to operation 204, where the host computer 122 obtains pressure data 116 generated by the pressure sensors 104 of the digital glove 100. The pressure data 116 can be continuously received from the digital glove 100 and stored or might be obtained from the digital glove 100 at the time the input is detected.

From operation 204, the routine 200 proceeds to operation 206, where the host computer 122 can perform one or more functions based upon the amount of pressure sensed at the time the input was detected on the touchscreen 256. The routine 200 then proceeds from operation 206 to operation 208, where the host computer 122 determines if haptic feedback is to be provided. If so, the routine 200 proceeds from operation 208 to operation 210, where the host computer 122 transmits haptic commands 126 to the main board 114 instructing the main board to activate the haptic device 124, or devices 124, in the finger, or fingers, where pressure value was sensed at the time input on the touchscreen 256 was detected. The routine 200 then proceeds from operation 210 back to operation 202 where additional input can be processed in the manner described above.

As mentioned above, the function performed by the host computer 122 might include, for example, presenting a user interface such as the menu 254 on the display 256 at the location 252 of the touch detected on the touchscreen 256, selecting a UI control at the location 252 on the touchscreen 256, activating a program on the computing device 100 associated with content (e.g. an icon) presented at the location 252 on the touchscreen 256, or initiating a function selected based upon the amount of pressure exerted. The function might also be selected based upon the particular finger used to touch the touchscreen 256. From operation 210, the routine 200 proceeds back to operation 202, where additional input can be processed in the manner described herein.

Attributing Input Made with a Digital Pen to a User Wearing a Digital Glove

Figure 3A:
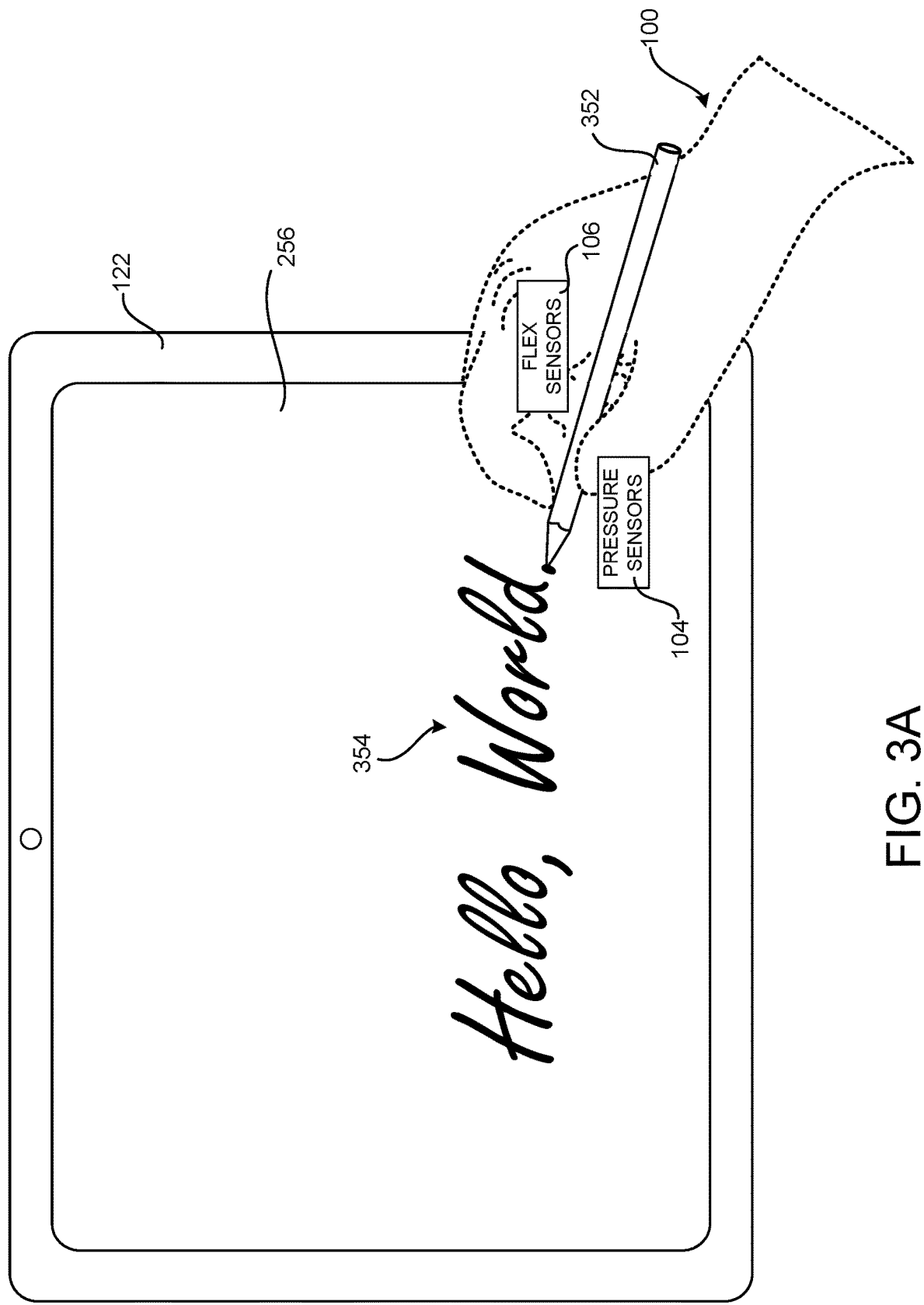
FIG. 3A is a schematic diagram showing aspects of the operation of a digital glove and a host computer for attributing input made with a digital pen to a user wearing the digital glove.

FIG. 3A is a schematic diagram showing aspects of the operation of a digital glove 100 and a host computer 122 for attributing input made with a digital pen 352 to a user wearing the digital glove 100. In this example, the host computer 122 is a tablet computing device equipped with a touchscreen 256. It is to be appreciated, however, that the configurations disclosed herein can be implemented with other types of computing devices capable of being utilized with a digital pen 352 such as, but not limited to, non-touch pen digitizer input devices. The host computer 122 can detect input made using the digital pen 352 on the touchscreen 256 or other type of surface, and generate digital ink 354 based upon the detected input.

In the example configuration shown in FIG. 3A, a user can be associated with the digital glove 100. For instance, the host computer 122 can provide a UI or other mechanism through which a user can indicate that they are the user of the digital glove 100. The host computer 122 can also provide a calibration process during which the user holds the digital pen 352 and writes on the touchscreen 256 or digital whiteboard. During the calibration process, the host computer 122 obtains pressure data 116 and flex data 118 from the digital glove 100. As will be described below, the host computer 122 can use this data later to determine if the digital glove 100 is holding a digital pen that is used to write on an input surface like the touchscreen 256 or a non-touch surface.

When the host computer 122 detects input (e.g. a user writing on the touchscreen 256 or non-touch pen digitizer surface with the digital pen 352), the host computer 122 obtains pressure data 116 and flex data 118 generated by the digital glove 100 at the time the input was made. The host computer 122 then determines, based at least in part on the pressure data 116 and the flex data 118, whether the digital glove 100 is being used to hold the digital pen 352 in a writing position. For example, the host computer 122 might compare the pressure data 116 and flex data 118 obtained at calibration time to the pressure data 116 and flex data 118 obtained at the time input is detected on the touchscreen 256.

In response to determining that the digital glove 100 is being used to hold the digital pen 100 in a writing position at the time the input was detected on the touchscreen 256, the host computer 122 can augment the input detected by the host computer 122 (e.g. the digital ink 354) with data identifying the user associated with the digital glove 100. For instance, the host computer 122 might store data identifying the user wearing the digital glove 100 as the user that wrote the digital ink 354 on the touchscreen 256.

The host computer 122 can also detect, based upon the pressure data 116 and/or the flex data 118, whether a user is exerting pressure on the barrel of the digital pen 352. For example, a user might perform a pinch gesture or double pinch gesture on the barrel of the digital pen 352 using two fingers. As another example, a user might slide one or more fingers along the barrel of the digital pen 352 (this gesture might be utilized to initiate a function similar to a mouse wheel). In response thereto, the host computer 122 can perform certain functions such as, but not limited to, modifying a setting associated with the digital pen 352. For instance, the host computer 122 might modify an ink color or pen type for digital ink 354 generated by the digital pen 100. The host computer 122 can also provide a command 126 to the digital glove 100 to activate a haptic device 124 in the digital glove 100 responsive to modifying the setting associated with the digital pen 352.

In some configurations, the host computer 122 can detect that the digital glove 100 has been taken off by one user and put on by another user. For example, the host computer 122 can compare the pressure data 116 and/or flex data 118 received from the digital glove 100 to pressure data 116 and/or flex data 118 obtained at calibration time to identify the current user of the digital glove 100. The host computer 122 can then load user-specific settings (e.g. visual style such as ink color or pen type) for the identified user, attribute digital ink 354 to the identified user, perform user-specific processing of the digital ink 354, or perform other user-specific processing. In a similar manner, the host computer 122 can detect that another user wearing their own digital glove is holding the same digital pen 352. In this case, the host computer 122 can load settings for that user, attribute digital ink to that user, etc.

Figure 3B:
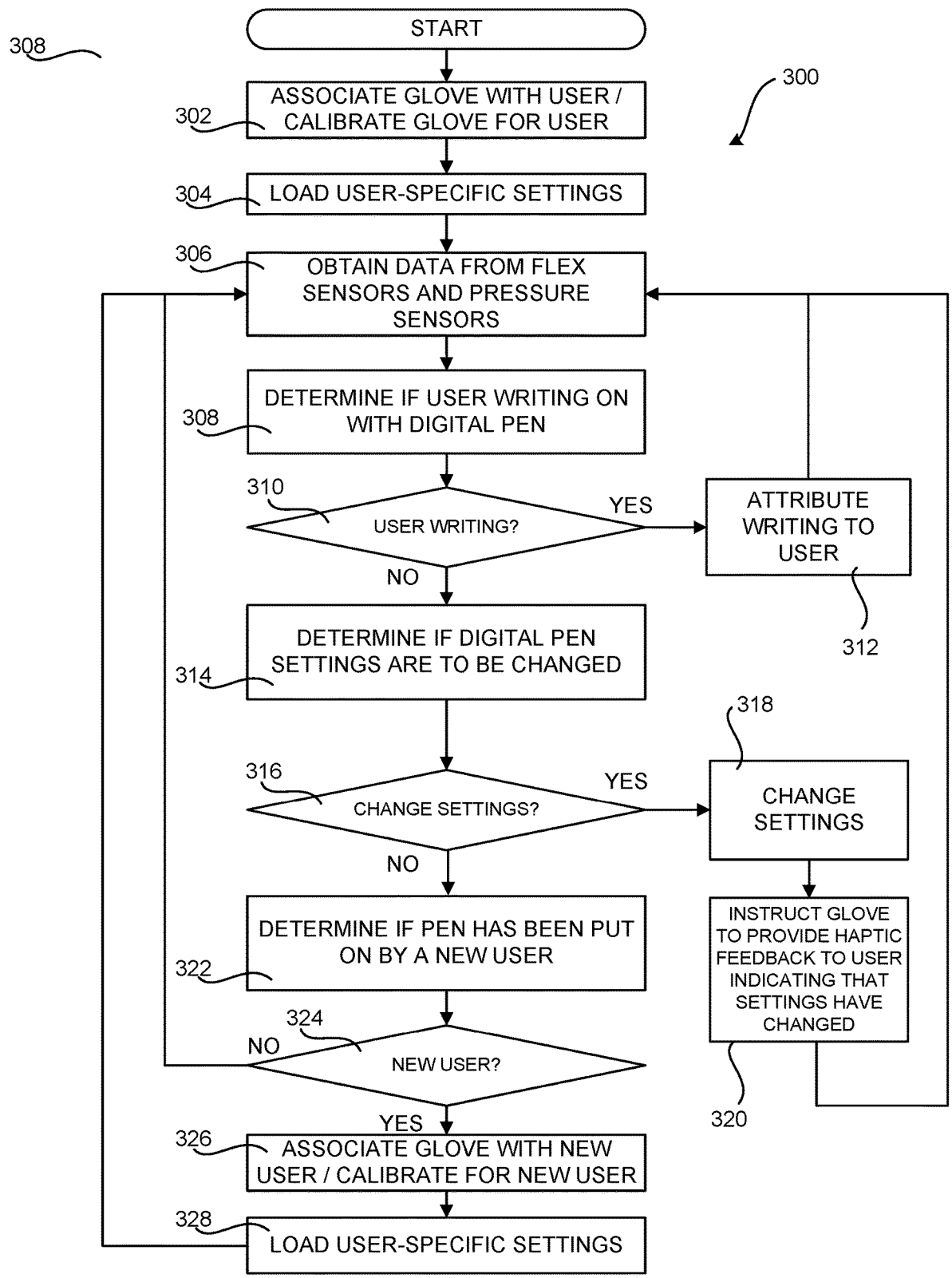
FIG. 3B is a flow diagram showing a routine that illustrates aspects of the operation of a digital glove and an associated host computer for attributing input made with a digital pen to a user wearing the digital glove, as described with reference to FIG. 3A.

FIG. 3B is a flow diagram showing a routine 300 that illustrates aspects of the operation of a digital glove 100 and an associated host computer 122 for attributing input made with a digital pen 352 to a user wearing the digital glove 100, as described with reference to FIG. 3A. The routine 300 begins at operation 302, where the digital glove 100 is associated with a particular user such as, for example, using biometric signals in the digital glove 100. Additionally, and as described above, a calibration process can be performed during which pressure data 116 and flex data 118 is obtained while the user is writing with the digital pen 352.

From operation 302, the routine 300 proceeds to operation 304, where the host computer 122 can load user-specific settings for the digital pen 352 such as, but not limited to, a user-specific pen color, pen type, or other visual style. The routine 300 then proceeds from operation 304 to operation 306.

At operation 306, the host computer 122 obtains pressure data 116 and flex data 118 from the digital pen 352. The routine 300 then proceeds to operations 308 and 310, where the host computer 122 determines, based on the pressure data 116 and/or the flex data 118, whether a user is writing on the touch surface. For example, if input is detected on the touch surface using the digital pen 352 and the pressure data 116 and/or the flex data 118 indicate that the digital pen 352 is being held in a writing position, the digital ink 354 generated by the input can be attributed to the user associated with the digital glove 100. This occurs at operation 312.

If the user is not writing on the touch surface with the digital pen 100, the routine 300 proceeds to operations 314 and 316, where the host computer 122 determines if settings (e.g. ink color or pen type) associated with the digital pen 352 are to be changed. As discussed above, a user can change settings associated with the digital pen 352 by performing pre-defined gestures on the barrel of the digital pen 352 in some configurations.

If the pressure data 116 and/or the flex data 118 indicate that the pre-defined gesture has been performed, the pen settings can be changed at operation 318. The host computer 122 can then transmit a command 126 to the digital glove 100 to provide haptic feedback to the user at operation 320. The routine 300 then proceeds from operation 320 back to operation 306, described above.

If the user has not requested to change settings associated with the digital pen 352, the routine 300 proceeds from operation 316 to operations 322 and 324, where the host computer 122 can determine, based on the pressure data 116 and/or the flex data 118, whether the digital glove 100 has been put on by a new user. If so, the routine 300 proceeds from operation 324 to operation 326, where the digital glove 100 can be associated with the new user. The calibration process described above might also be performed for the new user.

From operation 326, the routine 300 proceeds to operation 328, where user-specific pen settings (e.g. ink color or pen type) for the new user can be loaded. Thereafter, digital ink 354 generated by the digital glove 100 can be made using the user-specific pen settings and attributed to the new user. The routine 300 then proceeds from operation 328 back to operation 306, where additional input can be processed in a similar manner.

Augmenting the Functionality of User Input Devices Using a Digital Glove

FIGS. 4A-4D are schematic diagrams showing aspects of the operation of a digital glove 100 for augmenting the functionality provided by user input devices. In the example shown in FIGS. 4A-4C, for instance, the digital glove 100 is used to augment the functionality provided by a mouse 450. In the example shown in FIG. 4D, the digital glove 100 is used to augment the functionality provided by a digital dial 475. The digital glove 100 can be utilized to augment the functionality provided by other types of user input devices in other configurations. Accordingly, although the examples given below are presented in the context of a mouse and a digital dial, these examples should not be seen as limiting.

Figure 4A:
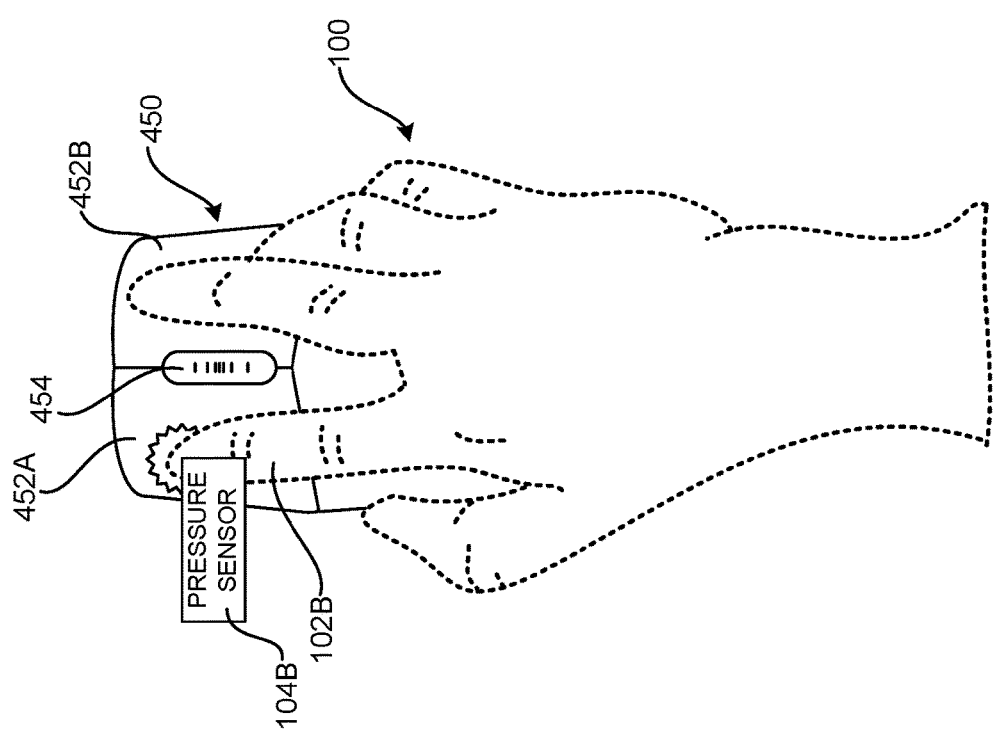
FIGS. 4A-4D are schematic diagrams showing aspects of the operation of a digital glove for augmenting the functionality provided by mice and digital dials.

As shown in FIG. 4A, a mouse 450 can include a number of buttons 452A and 452B. The mouse 450 might also include a scroll wheel 454, which might also act as a button. When the host computer 122 detects input, such as the selection of one of the buttons 452 on the mouse 450, the host computer 122 obtains pressure data 116 generated by the pressure sensors 104 in the digital glove 100. In the illustrated example, the user wearing the digital glove 100 has selected the button 452A with their index finger 102B. Accordingly, the pressure sensor 104B has generated pressure data 116 describing the pressure exerted during selection of the button 452A and provided the pressure data 116 to the host computer 122.

The host computer 122 then performs a function, or functions, that is selected based, at least in part, upon the particular finger, or fingers, used to exert pressure on the mouse 450 and/or the amount of pressure observed by the tactile pressure sensors 104 of the digital glove 100 at the time the input was made to the mouse 450. For example, when the host computer 122 detects the selection of the mouse button 452A, the host computer 122 can initiate a function based on the fact that the pressure data 116 indicates that the user's index finger 102B was used to select the button 452A and/or the amount of pressure exerted by the user's index finger 102B when the selection was made. The function can include, for instance, presenting a UI for modifying settings associated with the mouse 450.

Figure 4B:
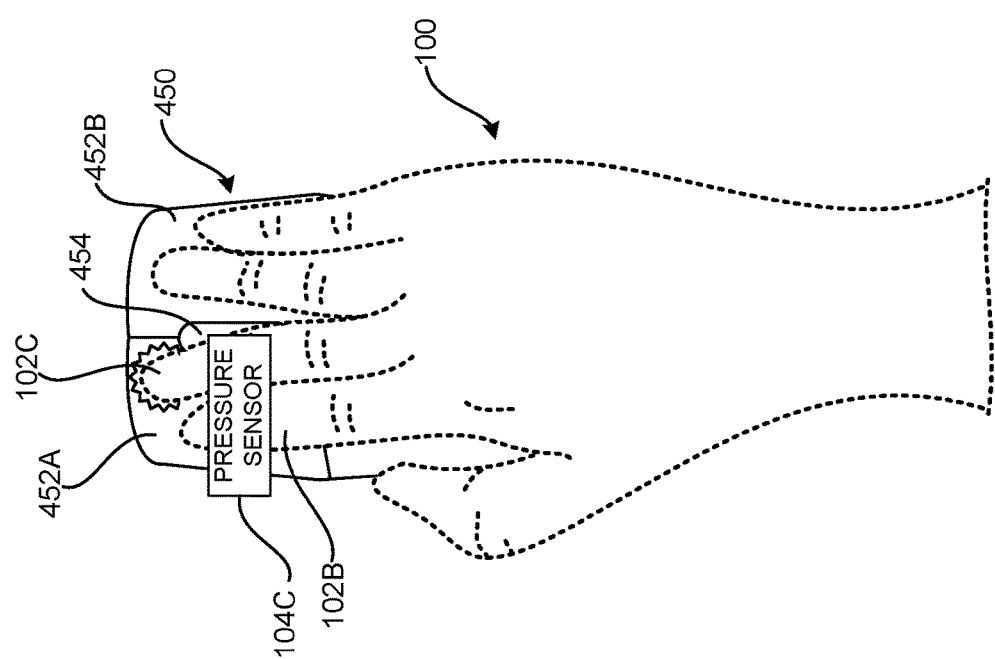
Figure 4C:
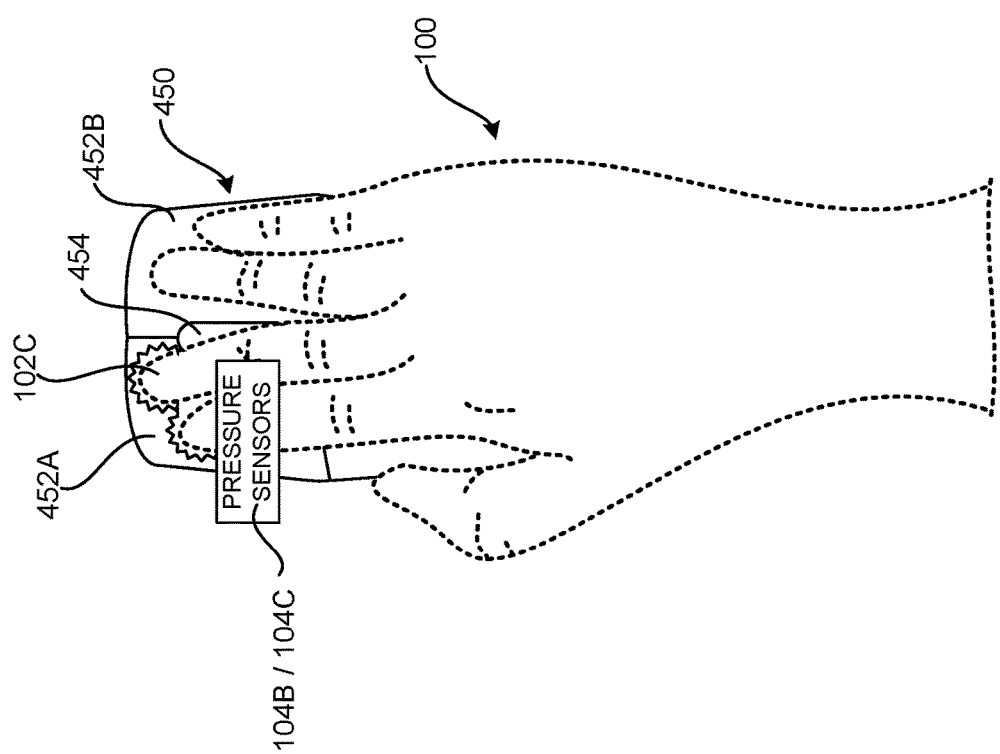

As illustrated in FIG. 4B, the host computer 122 might initiate a different function when a different finger is utilized to press the same button. In this example, for instance, the wearer of the digital glove 100 has utilized their middle finger 102C to press the button 452A of the mouse 450. In this case, the host computer 122 can perform a different function than performed when the user pressed the button 452A with their index finger 102B as illustrated in FIG. 4A. The host computer 122 can also perform a different function, or functions, when it detects that the user has utilized multiple fingers to perform a selection as in the example shown in FIG. 4C where the user has pressed the button 452A using their index finger 102B and middle finger 102C simultaneously.

Figure 4D:
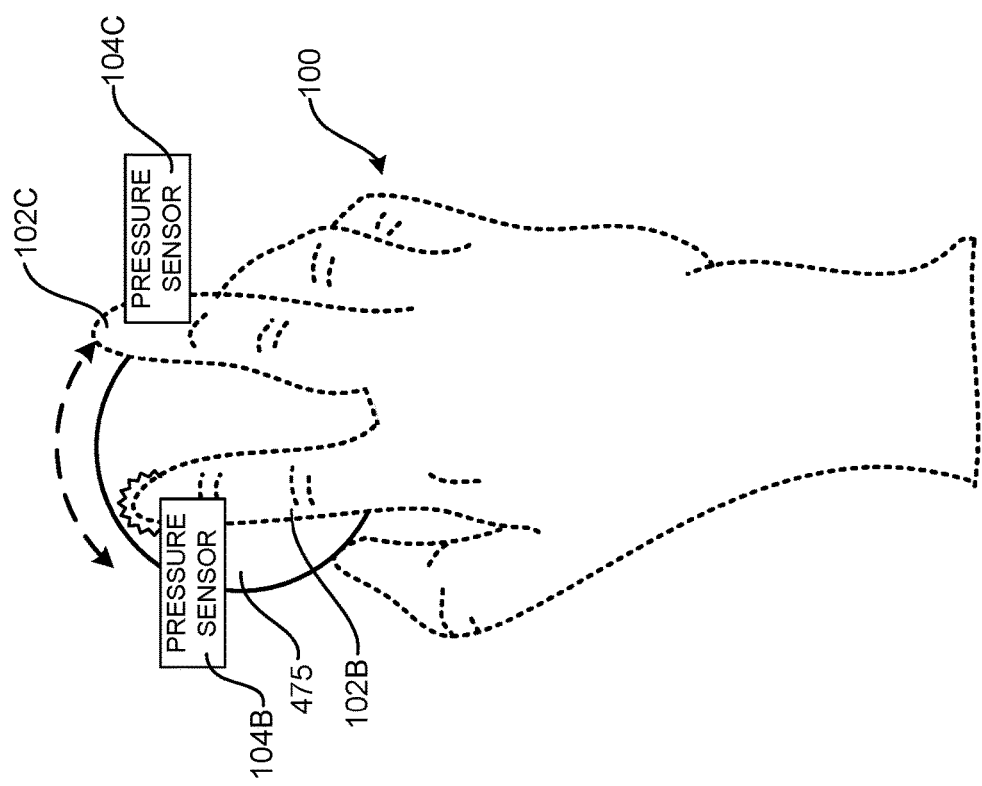

As illustrated in FIG. 4D, the host computer 122 can also initiate a function, or functions, based upon the finger, or fingers, used to press a button on a digital dial 475 (e.g. the SURFACE DIAL from MICROSOFT CORPORATION) and/or the amount of pressure exerted when pressing the button of the digital dial 475. Different functions might also be initiated based upon detecting that multiple fingers were used to select the button. The function can include, for instance, presenting a UI for modifying settings associated with the digital dial 475.

The host computer 122 can also provide a command to the digital glove 100 to activate a haptic device 124 when it detects that pressure was exerted at the time the input was made. The host computer 122 might only activate a haptic device 124 in the finger, or fingers, of the digital glove 100 used to exert pressure on the user input device at the time the user input was detected. For instance, haptic feedback might only be provided in the index finger 102B of the digital glove 100 in the examples shown in FIGS. 4A and 4D. Haptic feedback might be provided in the index finger 102B and middle finger 102C in the example shown in FIG. 4C.

Figure 4E:
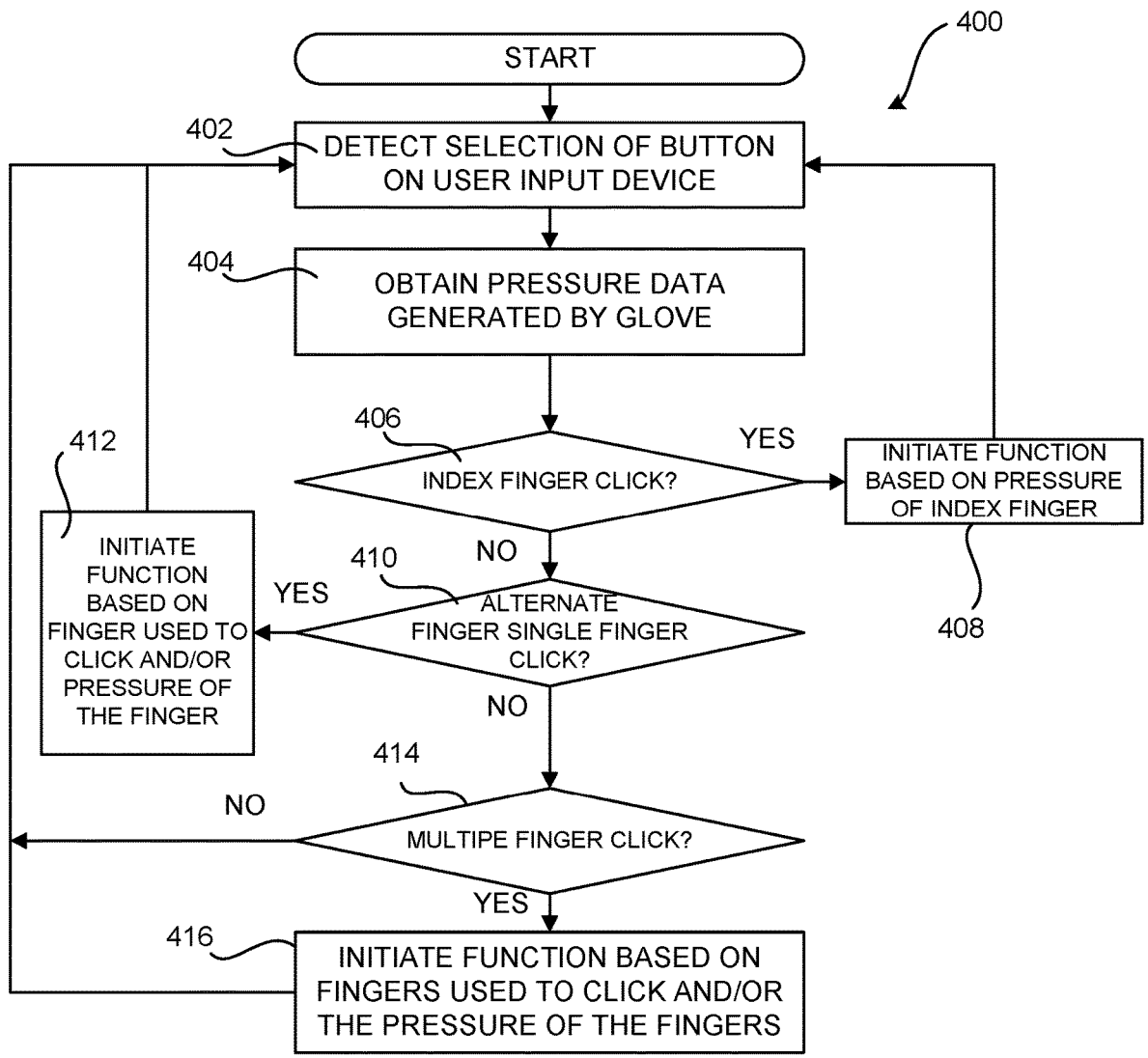
FIG. 4E is a flow diagram showing a routine that illustrates aspects of the operation of a digital glove for augmenting the functionality provided by mice and digital dials, as described with reference to FIG. 4A-4D.

FIG. 4E is a flow diagram showing a routine 400 that illustrates aspects of the operation of a digital glove 100 for augmenting the functionality provided by user input devices, as described with reference to FIG. 4A-4D. The routine 400 begins at operation 402, where the host computer 122 detects a press of a button on a user input device, such as a mouse button. The routine 400 then proceeds from operation 402 to operation 404, where the host computer 122 obtains the pressure data 116 generated by the digital glove 110 at the time the button was pressed.

From operation 404, the routine 400 proceeds to operation 406, where the host computer 122 determines if the pressure data 116 indicates that the user's index finger 102B was utilized to press the button. If so, the routine 400 proceeds to operation 408, where the host computer 122 initiates a function. In this example, the function is selected based upon the amount of pressure exerted by the user's index finger 102B at the time the button was pressed.

If the pressure data 116 indicates that the user's index finger 102B was not utilized to press the button, the routine 400 proceeds from operation 406 to operation 410. At operation 410, the host computer 122 uses the pressure data 116 to determine if the button was pressed with one of the user's other fingers, such as the user's middle finger 102C in the example shown in FIG. 4B. If so, the routine 400 proceeds from operation 410 to operation 412, where the host computer 122 performs a function that is selected based on the particular finger used to press the button and/or the pressure exerted when the button was pressed.

If the pressure data 116 indicates that the button was not pressed with single finger other than the index finger 102B, the routine 400 proceeds from operation 410 to operation 414. At operation 414, the host computer 122 uses the pressure data 116 to determine if the button was pressed with multiple fingers. If so, the routine 400 proceeds from operation 414 to operation 416, where the host computer 122 initiates a function that is selected based on the particular fingers used to press the button and/or the pressure exerted when the button was pressed. The routine 400 then proceeds from operation 416 to operation 402, described above.

Initiating Functions with Respect to Gaze Targets Using a Digital Glove

Figure 5A:
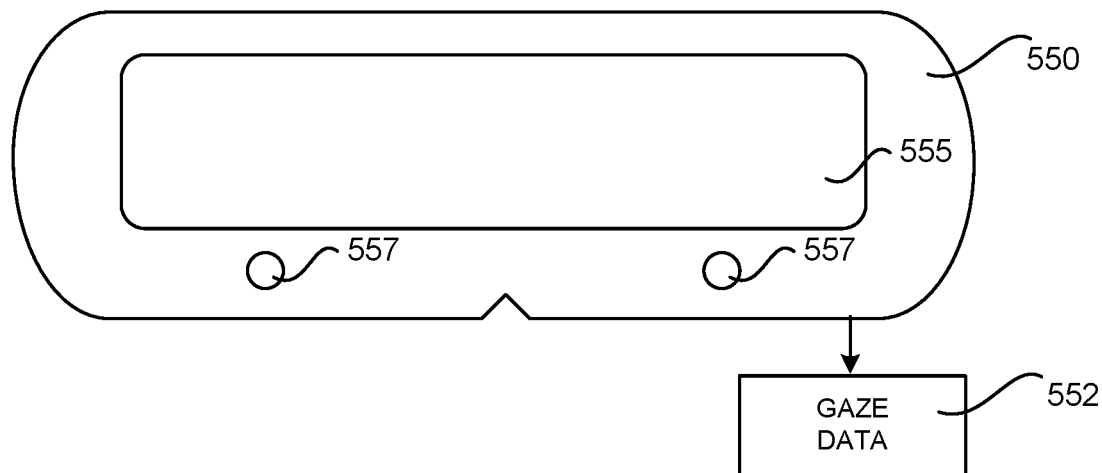
FIGS. 5A-5C are schematic diagrams showing aspects of the operation of a digital glove for initiating functions with respect to a gaze target identified by an eye-tracking system.
Figure 5B:
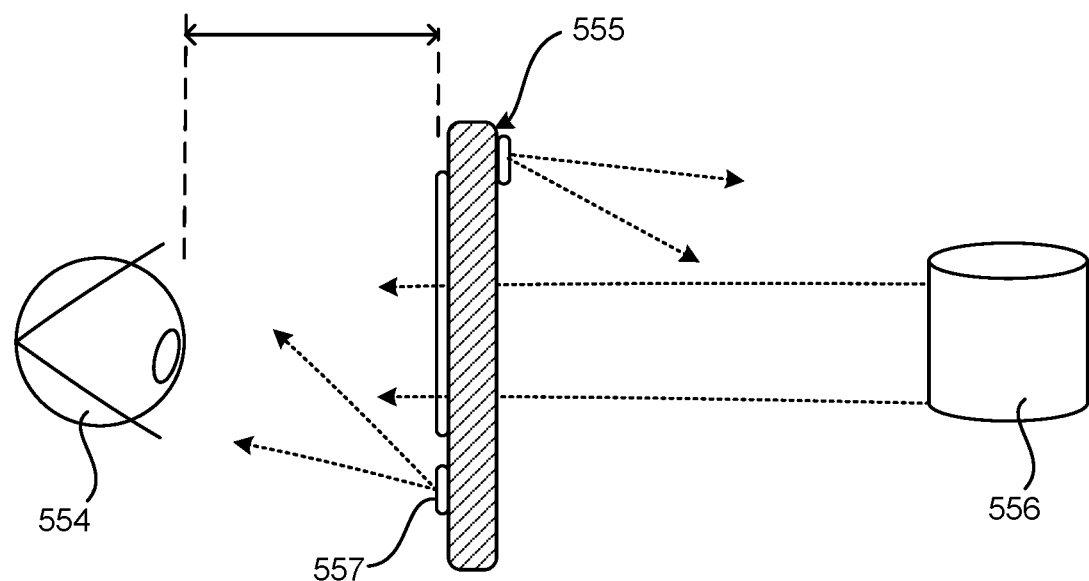
Figure 5C:
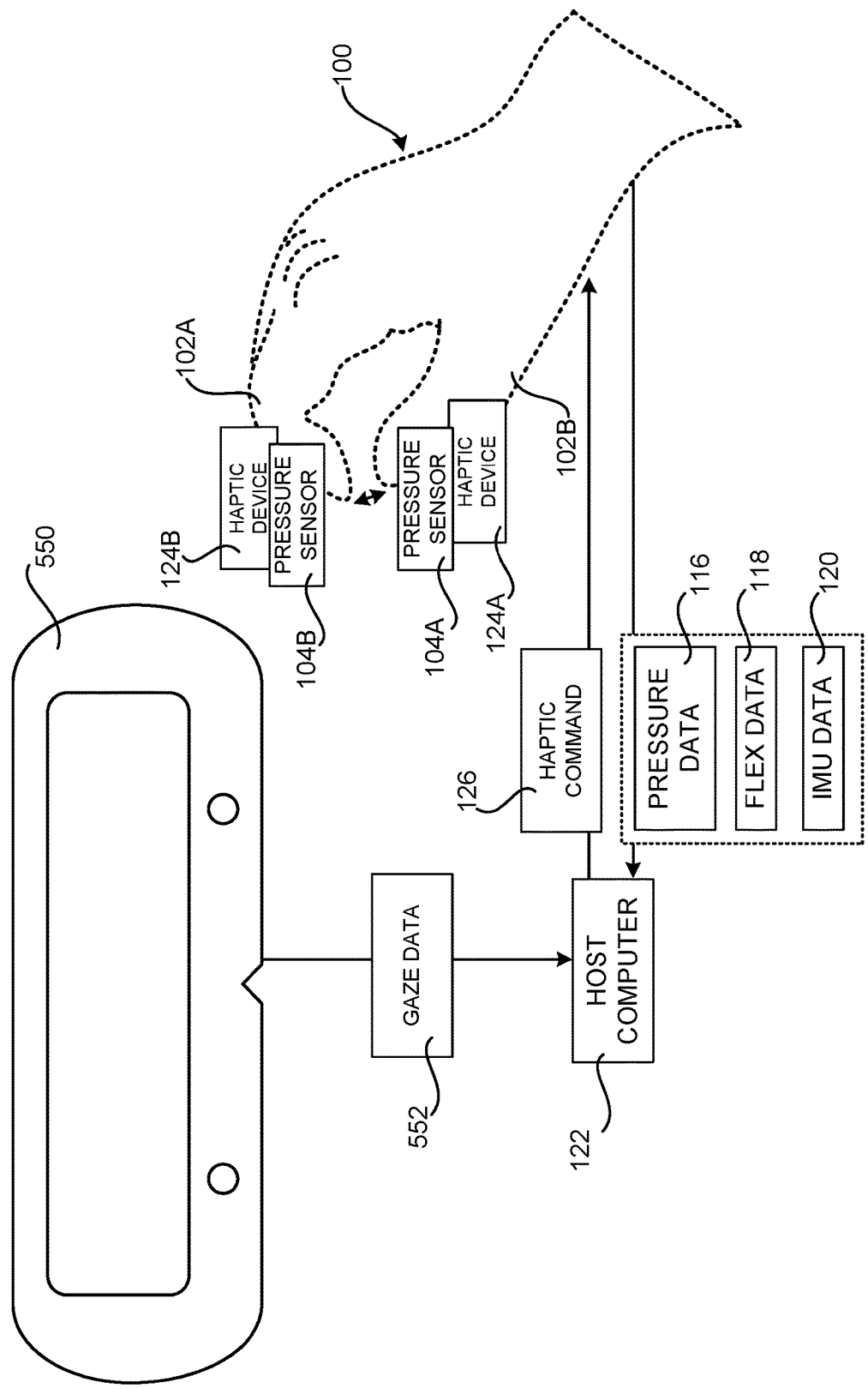

FIGS. 5A-5C are schematic diagrams showing aspects of the operation of a digital glove 100 for initiating functions with respect to gaze targets. In particular, FIG. 5A shows a back view of a device 550 that is configured to track the position of at least one eye of a user. In this example, the device 500 is an augmented reality ("AR") or virtual reality ("VR") device. Other types of computing devices capable of tracking the direction a user is looking can be utilized in other configurations.

As shown in FIG. 5A, the device 550 can generate gaze data 552 that describes the location, referred to as a "gaze target," that a user of the device 550 is looking at. The device 550 can identify the gaze target based upon eye position data, image data, and/or other data. The device 550 might also identify a particular object at the location of the gaze target, such as a rendered object displayed on a display 555 of the device 550 or a real-world person or object viewed through a transparent section of the display 555 of the device 550 (e.g. when the device 550 is an AR device).

In order to generate the gaze data 552, the device 550 can include sensors 557 generating data or a signal indicating the position or movement of at least one eye of a user. The sensors 557 can be in the form of a camera or another suitable device for tracking the position or movement of an eye. The device 550 also includes a display 555 for allowing a user to view one or more objects. The display 555 can provide a view of a real-world object through the display 555, as well as images of rendered objects that are displayed on the display 555 in some configurations.

FIG. 5B includes a side cutaway view of the device 550 shown in FIG. 5A, and illustrates an eye 568 of a user looking through the display 555 of the device 550. In this configuration, the display 555 is configured with sections enabling a user to view objects through the display 555. FIG. 5B also shows an example arrangement where a real-world object 556 is aligned with a transparent section of the display 555 allowing the user to view the real-world object through the display 555. The display 555 can display one or more rendered objects. The device 550 also includes at least one sensor 557 directed toward at least one eye of a user to determine the gaze target.

In some examples, the device 550 can utilize data from a combination of resources to determine if a user is looking at a real-world object 556 through the display 555 of the device 550. As summarized above, a camera or other type of sensor 558 mounted to the device 550 can be directed towards a user's field of view. Image data generated from the camera can be analyzed to determine the target of the user's gaze. Similar mechanisms can be utilized to determine if the user is looking at an object rendered on the display 555 of the device 550.

As illustrated in FIG. 5C, a digital glove 100 can be used to augment the functionality provided by a gaze tracking system such as that described with respect to FIGS. 5A and 5B. In particular, a host computer 122 can be coupled to a device 555 capable of generating gaze data 552 and to a digital glove 100, such as that described above. As in the examples described briefly above, the host computer 122 can obtain pressure data 116, flex data 118, and IMU data 120 from the digital glove.

The host computer 122 can determine, based on the pressure data 116 and/or the flex data 120, that a user wearing the digital glove 100 initiated a request to perform a function with the digital glove 100. For instance, the host computer 122 might determine, based on the pressure data 116, that a user of the digital glove 100 requested to initiate a function by tapping two fingers together. A request to perform a function can be initiated by performing other types of gestures while wearing the digital glove 100 in other configurations.

In response to detecting that a user wearing the digital glove 100 initiated a request to perform a function, the host computer 122 can identify an object based upon the gaze target identified at the time the user made the request. As mentioned above, the object might be a rendered object displayed on a display 555 of the device 550 or a real-world person or object viewed through a transparent section of the display 555 of the device 550 (e.g. when the device 550 is an AR device).

The host computer 122 can then perform a function with respect to the identified object. For example, the host computer 122 might select an on-screen object in response to determining that the user was looking at the on-screen object when the user made the request to perform the function. As another example, the host computer 122 might launch a program in response to determining that the user was looking at an on-screen icon corresponding to the program when the user made the request to perform the function. In another example, the host computer 122 might send a message to another user in response to determining that the wearer of the digital glove 100 was looking at the other user when the wearer of the digital glove 100 made the request to perform the function. The host computer 122 can perform other types of functions based upon the direction a user is looking when the user initiates a function using a digital glove 100 in other configurations.

Figure 5D:
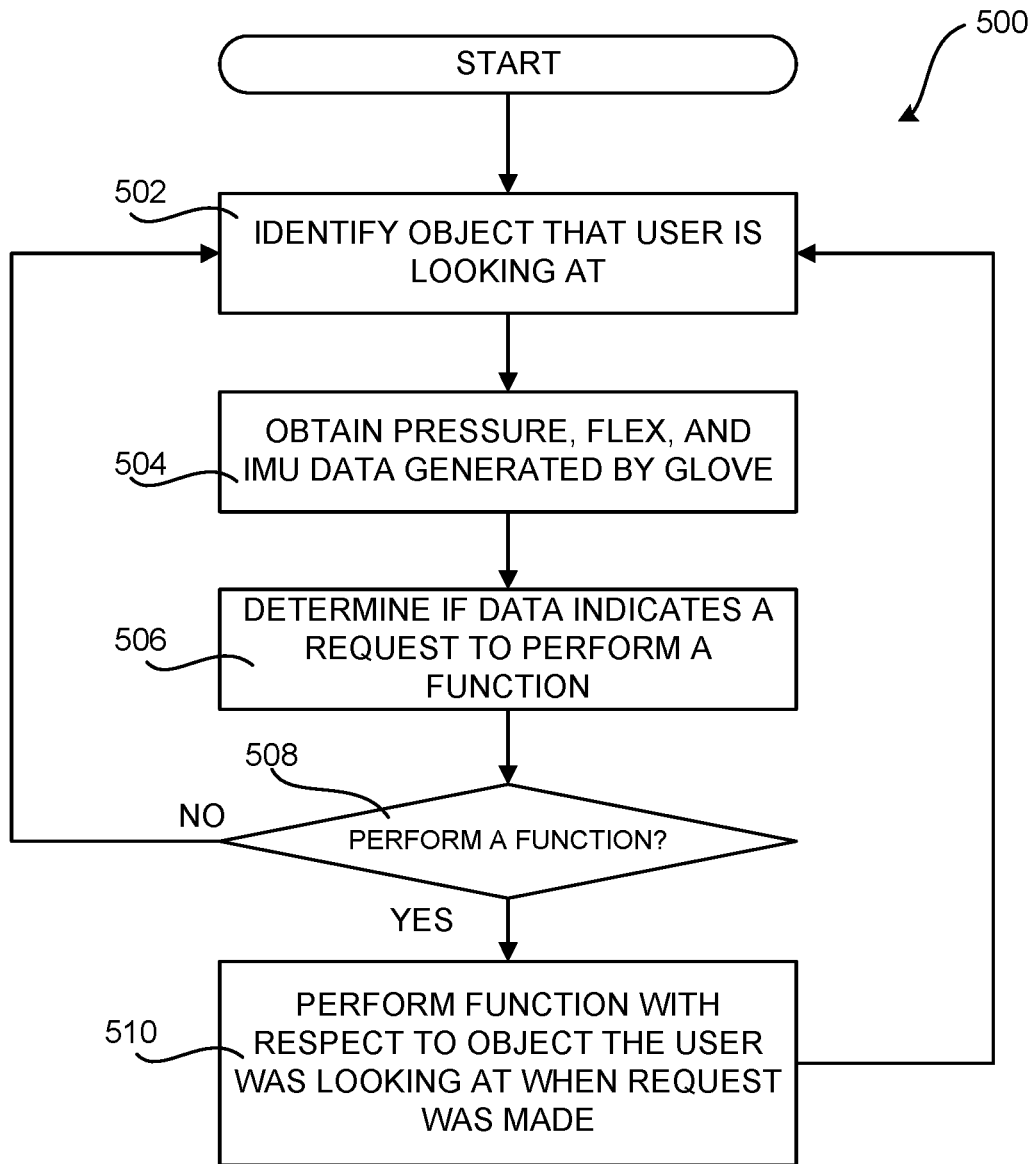
FIG. 5D is a flow diagram showing a routine that illustrates aspects of the operation of a digital glove for initiating functions with respect to a gaze target identified by an eye-tracking system, as described with reference to FIG. 5A-5C.

FIG. 5D is a flow diagram showing a routine 500 that illustrates aspects of the operation of a digital glove 100 for initiating functions with respect to gaze targets, as described with reference to FIG. 5A-5C. The routine 500 begins at operation 502, where a host computer 122 coupled to a device 550 identifies the on-screen or real-world object that a user is looking at. The routine 500 then proceeds from operation 502 to operation 504, where the host computer 122 obtains the pressure data 116, flex data 118, and IMU data 120 generated by the digital glove.

From operation 504, the routine 500 proceeds to operation 506, where the host computer 122 determines if the pressure data 116, flex data 118, and/or IMU data 120 indicates that the wearer of the digital glove 100 has requested to perform a function by performing a pre-defined gesture using the digital glove 100. For example, and without limitation, a user of the digital glove 100 might request to initiate a function by tapping two fingers together.

If the wearer of the digital glove 100 has made a request to initiate a function, the routine 500 proceeds from operation 508 to operation 510. At operation 510, the host computer 122 performs a function, such as those described above, with respect to the object that the user was looking at when the request to perform the function was made using the digital glove 100. The host computer 122 can also provide a command 126 to the digital glove 100 to activate a haptic device 124 in the digital glove 100 when the request is made to perform the function and/or when the function is performed. The routine 500 then proceeds from operation 510 back to operation 502, described above.

Improved Interface to a Speech Recognition Component Using a Digital Glove

FIG. 6A is a schematic diagram showing aspects of the operation of a digital glove 100 for providing an improved human-computer interface to a speech recognition component. As shown in FIG. 6A, the host computer 122 can be with a speech recognition component 656 capable of receiving audio dictation 654 from a user of the host computer 122 and converting the dictation 654 to text. The speech recognition component 656 can also process spoken voice commands 652. Examples of speech recognition components include, but are not limited to, the DRAGON NATURALLY SPEAKING speech recognition application from NUANCE.

As also shown in FIG. 6A, the speech recognition component 656 can present a UI 658 that includes a number of items. For example, the speech recognition component 656 might present a UI 658 that includes selectable items that identify phonetic alternates for a word dictated to the speech recognition component 658. Other types of UIs with other types of items can be presented in other configurations.

The host computer 122 can also obtain pressure data 116 and flex data 118 from the digital glove 100 as in the examples above. The host computer 122 can determine, based on the pressure data 116 and/or the flex data 118, that the wearer of the digital glove 100 has extended a finger, or fingers. In the example shown at the bottom of FIG. 6A, for instance, the wearer of the digital glove 100 has extended their index finger 102B.

In response to determining that the wearer of the digital glove 100 has extended a finger, the host computer 122 can select one of the items in the UI 658. The selected item can correspond to the finger of the digital glove 100 that has been extended. For instance, and as illustrated at the bottom of FIG. 6A, the host computer 122 might select the first item in the UI 658 in response to determining that a user has extended their index finger 102B. The host computer 122 might select the second item in the UI 658 in response to determining that a user has extended their middle finger 102C, select the third item in the UI 658 in response to determining that a user has extended their ring finger 102D, and so on.

The host computer 122 can also determine, based at least in part upon the pressure data 116 and the flex data 118, that a wearer of the digital glove 100 has performed a pinch gesture by touching together the tips of two or more fingers. For instance, in the example shown at the top of FIG. 6A, the pressure data 116 and flex data 118 indicates that the wearer of the digital glove 100 has touched the tips of their thumb 102A and their index finger 102.

In response to determining that a user has performed a pinch gesture using the digital glove 100, the host computer 122 can perform various functions. For example, the host computer 122 might select an item in the UI 658 based upon the particular fingers used to perform the pinch gesture. The first item in the UI 658 can be selected if the thumb 102A and index finger 102B are used to perform the pinch gesture, the second item in the UI 658 can be selected if the thumb 102A and middle finger 102C are used to perform the pinch gesture, and so on.

Other types of functions can also be initiated by the host computer 122 when a pinch gesture is detected such as, but not limited to, causing the speech recognition component 658 to switch between a dictation mode and a command mode (e.g. a mode where speech is used to perform commands rather than to dictate text) or to switch between a first dictation language (e.g. English) and a second dictation language (e.g. French). The particular command performed can be selected based on the fingers used to perform the pinch gesture.

The host computer 122 can also provide a command 126 to the digital glove 100 to activate a haptic device 124 when it detects that a finger was extended or a pinch gesture was performed. The host computer 122 might only activate a haptic device 124 in the finger, or fingers, of the digital glove 100 that were extended. For instance, haptic feedback might only be provided in the index finger 102B of the digital glove 100 in the example shown at the bottom of FIG. 6A. Haptic feedback might be provided in the thumb 102A and index finger 102B in the example shown at the top of FIG. 6A. Haptic feedback can be provided in other fingers or in all of the fingers of the digital glove 100 in other configurations.

FIG. 6B is a flow diagram showing a routine 600 that illustrates aspects of the operation of a digital glove 100 for providing an improved human-computer interface to a speech recognition component 656, as described with reference to FIG. 6A. The routine 600 begins at operation 602, where the host computer 122 obtains the pressure data 116, the flex data 118, and the IMU data 120 from the digital glove 100.

The routine 600 then proceeds from operation 602 to operation 604, where the host computer 122 determines if the data obtained from the digital glove 100 indicates that a user has requested to change modes of the speech recognition component 658. For example, the user might perform a pinch gesture with the thumb 102A and index finger 102B in order to select a command mode, in which case the routine 600 proceeds from operation 606 to operation 608. Similarly, the user might perform a pinch gesture with the thumb 102A and middle finger 102C in order to select a dictation mode, in which case the routine 600 proceeds from operation 606 to operation 610.

If the user has not made a gesture to change modes of the speech recognition component 658, the routine 600 proceeds from operation 606 to operation 614, where the host computer 122 determines if the data obtained from the digital glove 100 indicates that the user has requested to perform a selection operation, such as the selection of an item in the UI 658. As discussed above, a selection operation can be initiated by extending a finger corresponding to an item in the UI 658 or performing a pinch gesture corresponding to an item in the UI 658. If the user has performed a gesture for performing a selection operation, the routine 600 proceeds from operation 614 to operation 616, where the host computer 122 performs the appropriate selection operation based upon the data received from the digital glove 100. The routine 600 then proceeds from operation 616 to operation 602, described above.

Augmenting a 3D Model Created by a Motion Tracking System with Data Generated by a Digital Glove FIG. 7A is a schematic diagram showing aspects of the operation of a digital glove 100 for augmenting a 3D model created by a camera-based motion tracking system 700. The camera-based motion tracking system 700 can be used to recognize, analyze, and/or track a human target, such as the user 712, and to generate a 3D model 714 that includes a full or partial skeletal model of the user 712. In this example, the camera-based motion tracking system 700 includes host computer 122, which is coupled to a capture device 702.

The capture device 702 can capture images of one or more users 712 or other objects in an environment and generate a 3D model of the users 714 and/or the surrounding environment. The 3D model 714 can then be utilized for various purposes such as, but not limited to, presenting an on-screen avatar in a pose corresponding to the position of the user 712, navigating an on-screen UI (as shown in the example configuration illustrated in FIG. 7A), playing games, and/or other purposes.

In order to generate the 3D model 714, the capture device 702 may be configured to generate a depth map that includes depth values via any suitable technique including, for example, time-of-flight, structured light, stereo image, or the like. In one configuration, the capture device 702 organizes the calculated depth information into "Z layers," or layers that may be perpendicular to a Z axis extending from the capture device 702 along its line of sight. X and Y axes may be defined as being perpendicular to the Z axis. The Y axis may be vertical, and the X axis may be horizontal. Together, the X, Y and Z axes define the 3D real world space captured by capture device 702.

As shown in FIG. 7A, the capture device 702 may include a 3D camera 706, an IR light component 704, and an RGB camera 708. These components can be used in various combinations to capture a depth map of a scene. The depth map may include a 2D pixel area of the captured scene, where each pixel in the 2D pixel area represents a depth value such as a length or distance in, for example, centimeters, millimeters, or the like of an object in the captured scene from the capture device 702. The host computer 122 can utilize this information to generate a 3D model 714 of the scene that includes a 3D model of the user 712.

The capture device 702 can implement various technologies for generating the depth map for a scene. For example, in a time-of-flight analysis, the IR light component 704 of the capture device 702 can emit an infrared light onto a scene and use sensors to detect the backscattered light from the surface of one or more targets (e.g. the user 712) and objects in the scene using, for example, the 3D camera 706 and/or the RGB camera 708. Time-of-flight analysis can also be used to indirectly determine a physical distance from the capture device 702 to a particular location on the targets or objects by analyzing the intensity of the reflected beam of light over time via various techniques including, for example, shuttered light pulse imaging.

In some configurations, pulsed infrared light is used such that the time between an outgoing light pulse and a corresponding incoming light pulse can be measured and used to determine a physical distance from the capture device 702 to a particular location on the targets (e.g. the user 712) or objects in the scene. Additionally, in other example configurations, the phase of the outgoing light wave may be compared to the phase of the incoming light wave to determine a phase shift. The phase shift may then be used to determine a physical distance from the capture device 702 to a particular location on the targets or objects.

In another example configuration, the capture device 702 uses structured light to capture depth information. In such an analysis, patterned light (i.e., light displayed as a known pattern such as a grid pattern or a stripe pattern) is projected onto a scene via, for example, the IR light component 704. Upon striking the surface of one or more targets or objects in the scene, the pattern may become deformed. Such a deformation of the pattern may be captured by, for example, the 3D camera 706 and/or the RGB camera 708 and may then be analyzed to determine a physical distance from the capture device 702 to a particular location on the targets or objects.

According to another configuration, the capture device 702 includes two or more physically separated cameras that may view a scene from different angles to obtain visual stereo data that may be resolved to generate depth information. In another example configuration, the capture device 702 uses point cloud data and target digitization techniques to detect features of a user 712. Other techniques can be utilized in other configurations.

The capture device 702 can provide the depth information and images captured by, for example, the 3D camera 706 and/or the RGB camera 708 to the host computer 122. The host computer 122, in turn, can utilize this data to generate a 3D model 714, such as a partial skeletal model of the user 712, that describes the 3D position of the user 712 and their appendages.

As discussed briefly above, camera-based motion tracking systems are unable to model the position and pose of a user's hand if the hand is occluded from the view of the capture device 702. In the example shown in FIG. 7A for instance, the left hand of the user 712 is behind their back and is, therefore, occluded from the view of the capture device 702. As a result, the camera-based motion tracking system 700 will be unable to generate a 3D model 714 that includes a skeletal model of the left hand of the user 712.

In order to address this technical problem, the host computer 122 can determine the pose of an occluded hand of a user 712 and the location of the hand in space based upon the flex data 118, pressure data 116, and/or IMU data 120 obtained from the digital glove 100 worn on the occluded hand. In some configurations, the pose of the occluded hand 712 is computed using the last known location of the hand (as determined by the capture device 702). In this configuration, the IMU data 120 can be used to predict a relative displacement of the hand from its last known location. Data describing the hand pose can then be used to augment the 3D model 714 generated by the camera-based motion tracking system 700 and the host computer 122.

FIG. 7B is a flow diagram showing a routine 750 that illustrates aspects of the operation of a digital glove 100 for augmenting a 3D model created by a camera-based motion tracking system, as described with reference to FIG. 7A. The routine 750 begins at operation 752, where the camera-based motion tracking system 700 computes a 3D model 714 that includes a partial or full model of a user 712. The routine 750 then proceeds from operation 752 to operation 754, where the host computer 122 can determine if a hand of the user 712 is occluded from view of the capture device 702 and, therefore, not represented or represented inaccurately in the 3D model 714.

If a hand of the user 712 is occluded from the view of the capture device 702, the routine 750 proceeds from operation 754 to operation 756, where the host computer 122 obtains the flex data 118, pressure data 116, and/or IMU data 120 generated by the digital glove 100 for the occluded hand. The routine 750 then proceeds from operation 756 to operation 758, where the host computer 122 computes the pose and position of the occluded hand using the flex data 118, pressure data 116, and/or IMU data 120 generated by the digital glove 100. The routine 750 then continues to operation 760, where the host computer 122 augments the 3D model 714 generated by the camera-based motion tracking system 700 with the data describing the position and pose of the occluded hand. The routine 750 then proceeds back to operation 752, described above.

Figure 8:
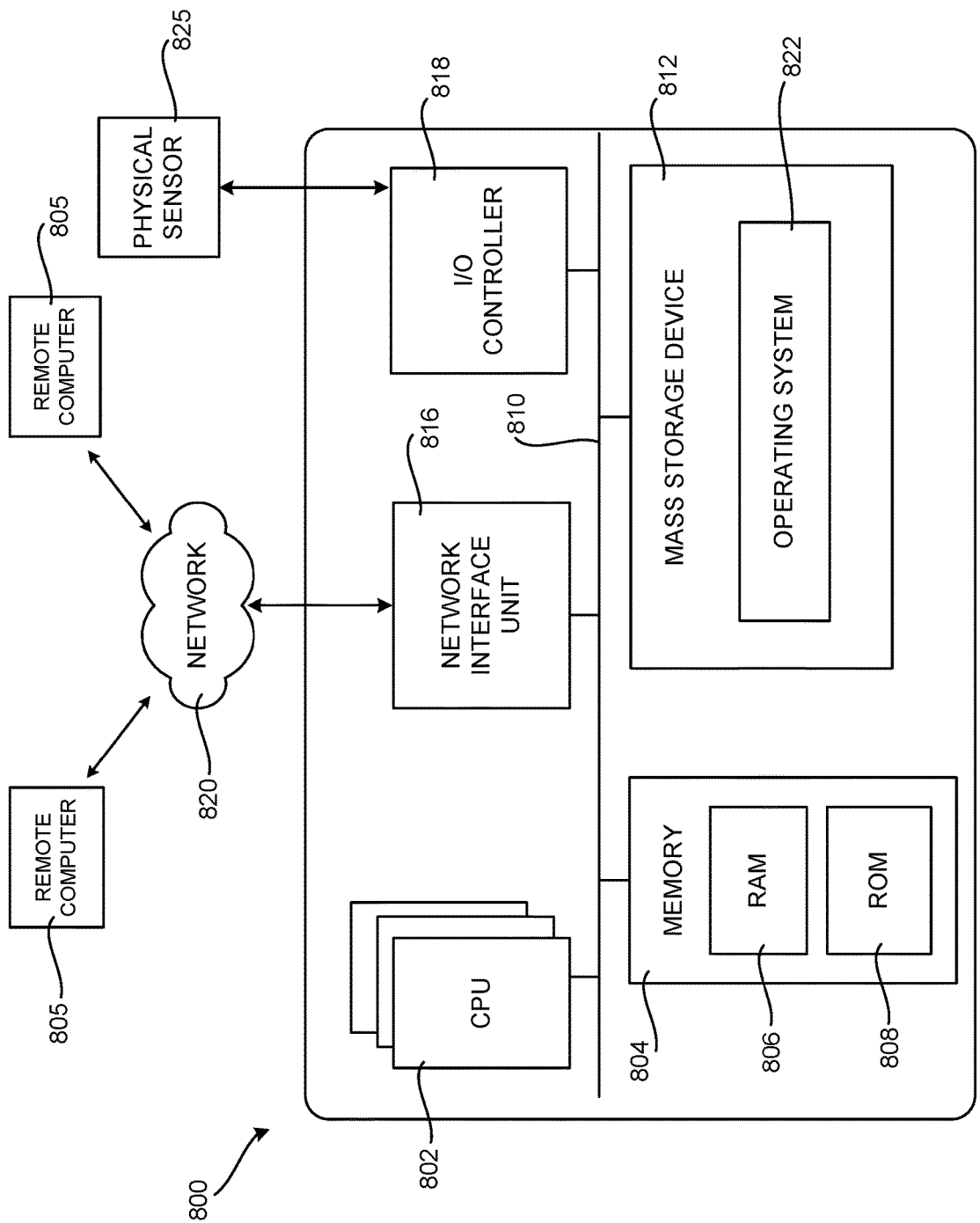
FIG. 8 is a computer architecture diagram showing an illustrative computer hardware and software architecture for a computing device that can implement aspects of the technologies presented herein.

FIG. 8 is a computer architecture diagram showing an illustrative computer hardware and software architecture for a host computer 122 that can implement the various technologies presented herein. In particular, the architecture illustrated in FIG. 8 can be utilized to implement a server computer, mobile phone, an e-reader, a smartphone, a desktop computer, an AR/VR device, a tablet computer, a laptop computer, or another type of computing device.

The computer 800 illustrated in FIG. 8 includes a central processing unit 802 ("CPU"), a system memory 804, including a random-access memory 806 ("RAM") and a read-only memory ("ROM") 808, and a system bus 810 that couples the memory 804 to the CPU 802. A basic input/output system ("BIOS" or "firmware") containing the basic routines that help to transfer information between elements within the computer 800, such as during startup, can be stored in the ROM 808. The computer 800 further includes a mass storage device 812 for storing an operating system 822, application programs, and other types of programs. The mass storage device 812 can also be configured to store other types of programs and data.

The mass storage device 812 is connected to the CPU 802 through a mass storage controller (not shown) connected to the bus 810. The mass storage device 812 and its associated computer readable media provide non-volatile storage for the computer 800. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 800. For purposes of the claims, the phrase "computer storage medium," and variations thereof, does not include waves or signals per se or communication media.

According to various configurations, the computer 800 can operate in a networked environment using logical connections to remote computers through a network such as the network 820. The computer 800 can connect to the network 820 through a network interface unit 816 connected to the bus 810. It should be appreciated that the network interface unit 816 can also be utilized to connect to other types of networks and remote computer systems. The computer 800 can also include an input/output controller 818 for receiving and processing input from a number of other devices, including a keyboard, mouse, touch input, an electronic stylus (not shown in FIG. 8), or a physical sensor such as a video camera. Similarly, the input/output controller 818 can provide output to a display screen or other type of output device (also not shown in FIG. 8).

It should be appreciated that the software components described herein, when loaded into the CPU 802 and executed, can transform the CPU 802 and the overall computer 800 from a general-purpose computing device into a special-purpose computing device customized to facilitate the functionality presented herein. The CPU 802 can be constructed from any number of transistors or other discrete circuit elements, which can individually or collectively assume any number of states. More specifically, the CPU 802 can operate as a finite-state machine, in response to executable instructions contained within the software modules disclosed herein. These computer-executable instructions can transform the CPU 802 by specifying how the CPU 802 transitions between states, thereby transforming the transistors or other discrete hardware elements constituting the CPU 802.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 800 in order to store and execute the software components presented herein. It also should be appreciated that the architecture shown in FIG. 8 for the computer 800, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 800 might not include all of the components shown in FIG. 8, can include other components that are not explicitly shown in FIG. 8, or can utilize an architecture completely different than that shown in FIG. 8.

Figure 9:
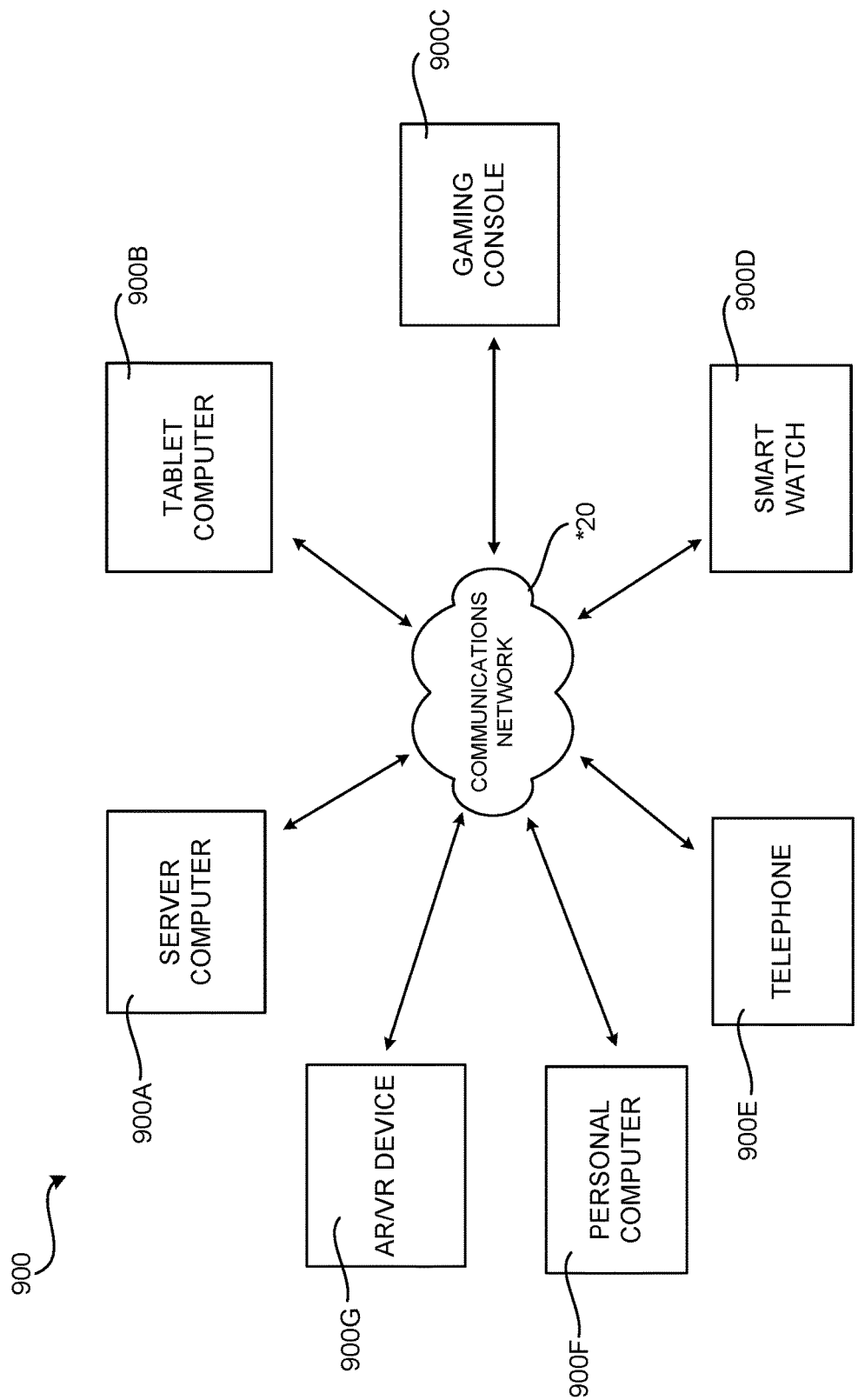
FIG. 9 is a network diagram illustrating a distributed computing environment in which aspects of the disclosed technologies can be implemented.

FIG. 9 is a network diagram illustrating a distributed network computing environment 900 in which aspects of the disclosed technologies can be implemented, according to various embodiments presented herein. As shown in FIG. 9, one or more server computers 900A can be interconnected via a communications network 820 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 900B, a gaming console 900C, a smart watch 900D, a telephone 900E, such as a smartphone, a personal computer 900F, and an AR/VR device 900G.

In a network environment in which the communications network 820 is the Internet, for example, the server computer 900A can be a dedicated server computer operable to process and communicate data to and from the client computing devices 900B-900G via any of a number of known protocols, such as, hypertext transfer protocol ("HTTP"), file transfer protocol ("FTP"), or simple object access protocol ("SOAP"). Additionally, the networked computing environment 900 can utilize various data security protocols such as secured socket layer ("SSL") or pretty good privacy ("PGP"). Each of the client computing devices 900B-900G can be equipped with an operating system operable to support one or more computing applications or terminal sessions such as a web browser (not shown in FIG. 9), or other graphical user interface (not shown in FIG. 9), or a mobile desktop environment (not shown in FIG. 9) to gain access to the server computer 900A.

The server computer 900A can be communicatively coupled to other computing environments (not shown in FIG. 9) and receive data regarding a participating user's interactions/resource network. In an illustrative operation, a user (not shown in FIG. 9) may interact with a computing application running on a client computing device 900B-900G to obtain desired data and/or perform other computing applications.

The data and/or computing applications may be stored on the server 900A, or servers 900A, and communicated to cooperating users through the client computing devices 900B-900G over an exemplary communications network 820. A participating user (not shown in FIG. 9) may request access to specific data and applications housed in whole or in part on the server computer 8800A. These data may be communicated between the client computing devices 900B-900G and the server computer 900A for processing and storage.

The server computer 900A can host computing applications, processes and applets for the generation, authentication, encryption, and communication of data and applications, and may cooperate with other server computing environments (not shown in FIG. 9), third party service providers (not shown in FIG. 9), network attached storage ("NAS") and storage area networks ("SAN") to realize application/data transactions.

It should be appreciated that the computing architecture shown in FIG. 8 and the distributed network computing environment shown in FIG. 9 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method, comprising: detecting input made to a user input device of a computing device; obtaining pressure data generated by a digital glove coupled to the computing device, the digital glove comprising a plurality of fingers, each of the plurality of fingers comprising at least one tactile pressure sensor for generating the pressure data; determining, based on the pressure data, an amount of pressure observed by a tactile pressure sensor for a finger of the digital glove at a time the input was made to the user input device; and performing a function on the computing device, the function being selected based, at least in part, upon the amount of pressure observed by the tactile pressure sensor for the finger of the digital glove at the time the input was made to the user input device.

Clause 2. The computer-implemented method of clause 1, wherein the user input device comprises a mouse and wherein the input comprises a selection of a mouse button.

Clause 3. The computer-implemented method of any of clauses 1-2, wherein the user input device comprises a digital dial and wherein the input comprises a selection of a digital dial button.

Clause 4. The computer-implemented method of any of clauses 1-3, wherein the function comprises presenting a user interface (UI) for modifying settings associated with the user input device.

Clause 5. The computer-implemented method of any of clauses 1-4, wherein the function is selected based, at least in part, on the finger of the plurality of fingers having the tactile pressure sensor that observed the amount of pressure.

Clause 6. The computer-implemented method of any of clauses 1-5, wherein the function is selected based, at least in part, upon a determination that a plurality of tactile pressure sensors observed pressure at the time the input made to the user input device.

Clause 7. The computer-implemented method of any of clauses 1-6, wherein the plurality of fingers of the digital glove further comprise a haptic device, and wherein the computer-implemented method further comprises providing a command to the digital glove to activate the haptic device in the finger of the plurality of fingers having the tactile pressure sensor that observed the amount of pressure.

Clause 8. A computing device, comprising: a processor; and a computer-readable storage medium having executable instructions stored thereupon which, when executed by the processor, will cause the computing device to: detect input made to a user input device of the computing device; obtain pressure data generated by a digital glove coupled to the computing device, the digital glove comprising a plurality of fingers, each of the plurality of fingers comprising at least one tactile pressure sensor for generating the pressure data; determine, based on the pressure data, an amount of pressure observed by a tactile pressure sensor for a finger of the digital glove at a time the input was made to the user input device; and perform a function on the computing device, the function being selected based, at least in part, upon the amount of pressure observed by the tactile pressure sensor for the finger of the digital glove at the time the input was made to the user input device.

Clause 9. The computing device of clause 8, wherein the user input device comprises a mouse and wherein the input comprises a selection of a mouse button.

Clause 10. The computing device of any of clauses 8-9, wherein the user input device comprises a digital dial and wherein the input comprises a selection of a digital dial button.

Clause 11. The computing device of any of clauses 8-10, wherein the function comprises presenting a user interface (UI) for modifying settings associated with the user input device.

Clause 12. The computing device of any of clauses 8-11, wherein the function is selected based, at least in part, on the finger of the plurality of fingers having the tactile pressure sensor that observed the amount of pressure.

Clause 13. The computing device of any of clauses 8-12, wherein the function is selected based, at least in part, upon a determination that a plurality of tactile pressure sensors observed pressure at the time the input made to the user input device.

Clause 14. The computing device of any of clauses 8-13, wherein the plurality of fingers of the digital glove further comprise a haptic device, and wherein the computer-implemented method further comprises providing a command to the digital glove to activate the haptic device in the finger of the plurality of fingers having the tactile pressure sensor that observed the amount of pressure.

Clause 15. A computer-implemented method, comprising: obtaining pressure data and flex data from a digital glove coupled to a computing device, the digital glove comprising a plurality of fingers, each of the plurality of fingers comprising at least one tactile pressure sensor for generating the pressure data and at least one flex sensor for generating the flex data; determining, based at least in part upon the pressure data or the flex data, that a request to perform a function was made at a first time; identifying an object based upon a gaze target of a user wearing the digital glove, the gaze target identified at the first time; and performing a function on the computing device with respect to the identified object.

Clause 16. The computer-implemented method of clause 15, wherein the function comprises selecting the object.

Clause 17. The computer-implemented method of any of clauses 15-16, wherein the function comprises activating the object.

Clause 18. A computing device, comprising: a processor; and a computer-readable storage medium having executable instructions stored thereupon which, when executed by the processor, will cause the computing device to: obtain pressure data and flex data from a digital glove coupled to the computing device, the digital glove comprising a plurality of fingers, each of the plurality of fingers comprising at least one tactile pressure sensor for generating the pressure data and at least one flex sensor for generating the flex data; determine, based at least in part upon the pressure data or the flex data, that a request to perform a function was made at a first time; identify an object based upon a gaze target of a user wearing the digital glove, the gaze target identified at the first time; and perform a function on the computing device with respect to the identified object.

Clause 19. The computer-implemented method of clause 18, wherein the function comprises selecting the object.

Clause 20. The computer-implemented method of any of clauses 18-19, wherein the function comprises activating the object.

Based on the foregoing, it should be appreciated that technologies for augmenting the functionality provided by user input devices using a digital glove have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
   detecting input made to a user input device of a computing device;
   obtaining pressure data generated by a digital glove coupled to the computing device, the digital glove comprising a plurality of fingers, each of the plurality of fingers comprising at least one tactile pressure sensor for generating the pressure data;
   determining, based on the pressure data, an amount of pressure observed by a tactile pressure sensor for a finger of the digital glove at a time the input was made to the user input device; and
   performing a function on the computing device, the function being selected based, at least in part, upon the amount of pressure observed by the tactile pressure sensor for the finger of the digital glove at the time the input was made to the user input device.

2. The computer-implemented method of claim 1, wherein the user input device comprises a mouse and wherein the input comprises a selection of a mouse button.

3. The computer-implemented method of claim 1, wherein the user input device comprises a digital dial and wherein the input comprises a selection of a digital dial button.

4. The computer-implemented method of claim 1, wherein the function comprises presenting a user interface (UI) for modifying settings associated with the user input device.

5. The computer-implemented method of claim 1, wherein the function is selected based, at least in part, on the finger of the plurality of fingers having the tactile pressure sensor that observed the amount of pressure.

6. The computer-implemented method of claim 1, wherein the function is selected based, at least in part, upon a determination that a plurality of tactile pressure sensors observed pressure at the time the input made to the user input device.

7. The computer-implemented method of claim 1, wherein the plurality of fingers of the digital glove further comprise a haptic device, and wherein the computer-implemented method further comprises providing a command to the digital glove to activate the haptic device in the finger of the plurality of fingers having the tactile pressure sensor that observed the amount of pressure.

8. A computing device, comprising:
   a processor; and
   a computer-readable storage medium having executable instructions stored thereupon which, when executed by the processor, will cause the computing device to:
   detect input made to a user input device of the computing device;
   obtain pressure data generated by a digital glove coupled to the computing device, the digital glove comprising a plurality of fingers, each of the plurality of fingers comprising at least one tactile pressure sensor for generating the pressure data;
   determine, based on the pressure data, an amount of pressure observed by a tactile pressure sensor for a finger of the digital glove at a time the input was made to the user input device; and
   perform a function on the computing device, the function being selected based, at least in part, upon the amount of pressure observed by the tactile pressure sensor for the finger of the digital glove at the time the input was made to the user input device.

9. The computing device of claim 8, wherein the user input device comprises a mouse and wherein the input comprises a selection of a mouse button.

10. The computing device of claim 8, wherein the user input device comprises a digital dial and wherein the input comprises a selection of a digital dial button.

11. The computing device of claim 8, wherein the function comprises presenting a user interface (UI) for modifying settings associated with the user input device.

12. The computing device of claim 8, wherein the function is selected based, at least in part, on the finger of the plurality of fingers having the tactile pressure sensor that observed the amount of pressure.

13. The computing device of claim 8, wherein the function is selected based, at least in part, upon a determination that a plurality of tactile pressure sensors observed pressure at the time the input made to the user input device.

14. The computing device of claim 8, wherein the plurality of fingers of the digital glove further comprise a haptic device, and wherein the computer-implemented method further comprises providing a command to the digital glove to activate the haptic device in the finger of the plurality of fingers having the tactile pressure sensor that observed the amount of pressure.

15. A computer-implemented method, comprising:
   obtaining pressure data and flex data from a digital glove coupled to a computing device, the digital glove comprising a plurality of fingers, each of the plurality of fingers comprising at least one tactile pressure sensor for generating the pressure data and at least one flex sensor for generating the flex data;
   determining, based at least in part upon the pressure data or the flex data, that a request to perform a function was made at a first time;
   identifying an object based upon a gaze target of a user wearing the digital glove, the gaze target identified at the first time; and
   performing a function on the computing device with respect to the identified object.

16. The computer-implemented method of claim 15, wherein the function comprises selecting the object.

17. The computer-implemented method of claim 15, wherein the function comprises activating the object.

18. A computing device, comprising:
   a processor; and
   a computer-readable storage medium having executable instructions stored thereupon which, when executed by the processor, will cause the computing device to:
   obtain pressure data and flex data from a digital glove coupled to the computing device, the digital glove comprising a plurality of fingers, each of the plurality of fingers comprising at least one tactile pressure sensor for generating the pressure data and at least one flex sensor for generating the flex data;
   determine, based at least in part upon the pressure data or the flex data, that a request to perform a function was made at a first time;

identify an object based upon a gaze target of a user wearing the digital glove, the gaze target identified at the first time; and perform a function on the computing device with respect to the identified object.

19. The computer-implemented method of claim 18, wherein the function comprises selecting the object.

20. The computer-implemented method of claim 18, wherein the function comprises activating the object.

* * * * *